(12) United States Patent
Anderson et al.

(10) Patent No.: US 11,352,149 B2
(45) Date of Patent: Jun. 7, 2022

(54) SYSTEMS AND METHODS FOR ASSEMBLING CONTAINERIZED AIRCRAFT

(71) Applicant: The Boeing Company, Chicago, IL (US)

(72) Inventors: Joseph D. Anderson, Seattle, WA (US); Don Russell, Arlington, WA (US); Matthew B. Moore, Edmonds, WA (US); Jason Warner, Granite Falls, WA (US); David Jon Herman, Monroe, WA (US); Patrick B. Stone, Monroe, WA (US); Michael David Collier, Sr., Everett, WA (US)

(73) Assignee: The Boeing Company, Chicago, IL (US)

( * ) Notice: Subject to any disclaimer, the term of this patent is extended or adjusted under 35 U.S.C. 154(b) by 132 days.

(21) Appl. No.: 16/735,315

(22) Filed: Jan. 6, 2020

(65) Prior Publication Data
US 2021/0206514 A1 Jul. 8, 2021

(51) Int. Cl.
*B64F 5/10* (2017.01)
*B64F 5/50* (2017.01)

(52) U.S. Cl.
CPC ............ *B64F 5/10* (2017.01); *B64F 5/50* (2017.01); *B64C 2211/00* (2013.01)

(58) Field of Classification Search
CPC .......... B64F 5/10; B64F 5/50; B64C 2211/00; B64C 1/068; B64C 1/26; B60P 3/11
USPC ....................................................... 29/426.3
See application file for complete search history.

(56) References Cited

U.S. PATENT DOCUMENTS

| 3,353,862 A * | 11/1967 | Tormolen ............. B60P 3/11 410/2 |
| 4,171,114 A * | 10/1979 | Marden ............... B60P 3/11 114/261 |
| 5,119,935 A * | 6/1992 | Stump ................. B64F 1/22 206/335 |

(Continued)

*Primary Examiner* — Lawrence Averick
(74) *Attorney, Agent, or Firm* — Dascenzo Gates Intellectual Property Law, P.C.

(57) ABSTRACT

Methods and systems for assembling containerized aircraft as complete aircraft. The methods comprise removing aircraft components from shipping container(s), unloading the aircraft components from shipping fixture(s), removing tooling comprising aircraft component positioning structure(s) from the shipping container(s), loading aircraft component(s) onto aircraft component positioning structure(s), positioning the aircraft components in aircraft component installation positions, positioning the aircraft component(s) using the aircraft component positioning structure(s), and attaching the aircraft components to assemble the complete aircraft. The systems comprise aircraft components configured to be loaded into shipping container(s) in a shipping arrangement, unloaded from the shipping arrangement and attached to at least one other aircraft component to assemble the complete aircraft; shipping fixture(s) configured to support the aircraft components in the shipping arrangement, and tooling configured to facilitate assembly of the aircraft components and comprising aircraft component positioning structure(s) configured to position aircraft component(s) in aircraft component installation position(s).

20 Claims, 25 Drawing Sheets

(56) References Cited

U.S. PATENT DOCUMENTS

| | | | | |
|---|---|---|---|---|
| 6,948,681 B2* | 9/2005 | Stupakis | .................. | B64C 39/02 |
| | | | | 244/117 R |
| 8,967,526 B2* | 3/2015 | Karem | ...................... | B64C 1/00 |
| | | | | 244/36 |
| 9,718,390 B1* | 8/2017 | Hadley | ................... | B60P 1/025 |
| 10,207,621 B2* | 2/2019 | Friemel | ................. | B62D 33/08 |
| 11,135,961 B2* | 10/2021 | Lamy | ......................... | B64F 5/50 |
| 2004/0135031 A1* | 7/2004 | Stupakis | ............... | B64C 39/024 |
| | | | | 244/120 |
| 2012/0292435 A1* | 11/2012 | Karem | ...................... | B64C 1/00 |
| | | | | 244/36 |
| 2018/0001812 A1* | 1/2018 | Friemel | .................. | B62D 63/08 |
| 2019/0322206 A1* | 10/2019 | Lamy | ..................... | B62D 33/04 |

* cited by examiner

SYSTEMS AND METHODS FOR ASSEMBLING CONTAINERIZED AIRCRAFT

FIELD

The present disclosure relates to systems and methods for assembling containerized aircraft.

BACKGROUND

Traditionally, assembly of aircraft is performed in large, centralized indoor assembly facilities, which rely on significant personnel, open floor space, and extensive manufacturing infrastructure for assembling aircraft. For example, conventional aircraft assembly facilities typically utilize production lines in conjunction with monument style tooling such as high bays and cranes for traditional assembly of critical aircraft components. The manufacturing requirements associated with traditional indoor assembly facilities not only are costly, but the centralized nature of this type of manufacturing can create lengthy lead times resulting from production backup. Moreover, most complete aircraft manufactured in these facilities must be certified and flight worthy before being delivered to a customer, and the routes for delivering smaller aircraft typically are indirect and expensive. Thus, there exists a need for systems and methods for assembling aircraft offsite from centralized, indoor assembly facilities that permit the assembly to be performed in a variety of assembly environments, such as the location of the receiving customer.

SUMMARY

Methods and systems for assembling containerized aircraft as complete aircraft are disclosed herein. The methods for assembling containerized aircraft as complete aircraft comprise removing a plurality of aircraft components supported on one or more shipping fixtures from one or more shipping containers, unloading the plurality of aircraft components from the one or more shipping fixtures, and removing tooling from the one or more shipping containers, in which the tooling comprises one or more aircraft component positioning structures. The methods further comprise loading one or more aircraft components onto respective aircraft component positioning structures, positioning the plurality of aircraft components in corresponding aircraft component installation positions, in which the positioning of the one or more aircraft components comprises positioning using the respective aircraft component positioning structures, and assembling the plurality of aircraft components as the complete aircraft by attaching each aircraft component to at least one other aircraft component in the corresponding aircraft component installation position.

The systems for assembling the containerized aircraft as the complete aircraft comprise a plurality of aircraft components configured to be loaded into one or more shipping containers in a shipping arrangement, in which each aircraft component of the plurality of aircraft components is configured to be unloaded from the shipping arrangement and attached to at least one other aircraft component of the plurality of aircraft components to assemble the plurality of aircraft components into the complete aircraft. The systems further comprise one or more shipping fixtures configured to support the plurality of aircraft components in the shipping arrangement, and tooling configured to facilitate assembly of the plurality of aircraft components into the complete aircraft, in which the tooling comprises one or more aircraft component positioning structures that each are configured to position at least one respective aircraft component in a corresponding aircraft component installation position during assembly of the complete aircraft.

DETAILED DESCRIPTION

Systems and methods for the assembly of a containerized aircraft as a complete aircraft are disclosed herein. Generally, in the Figures, elements that are likely to be included in a given example are illustrated in solid lines, while elements that are optional to a given example are illustrated in broken lines. However, elements that are illustrated in solid lines are not essential to all examples of the present disclosure, and an element shown in solid lines may be omitted from a particular example without departing from the scope of the present disclosure.

Figure 1:
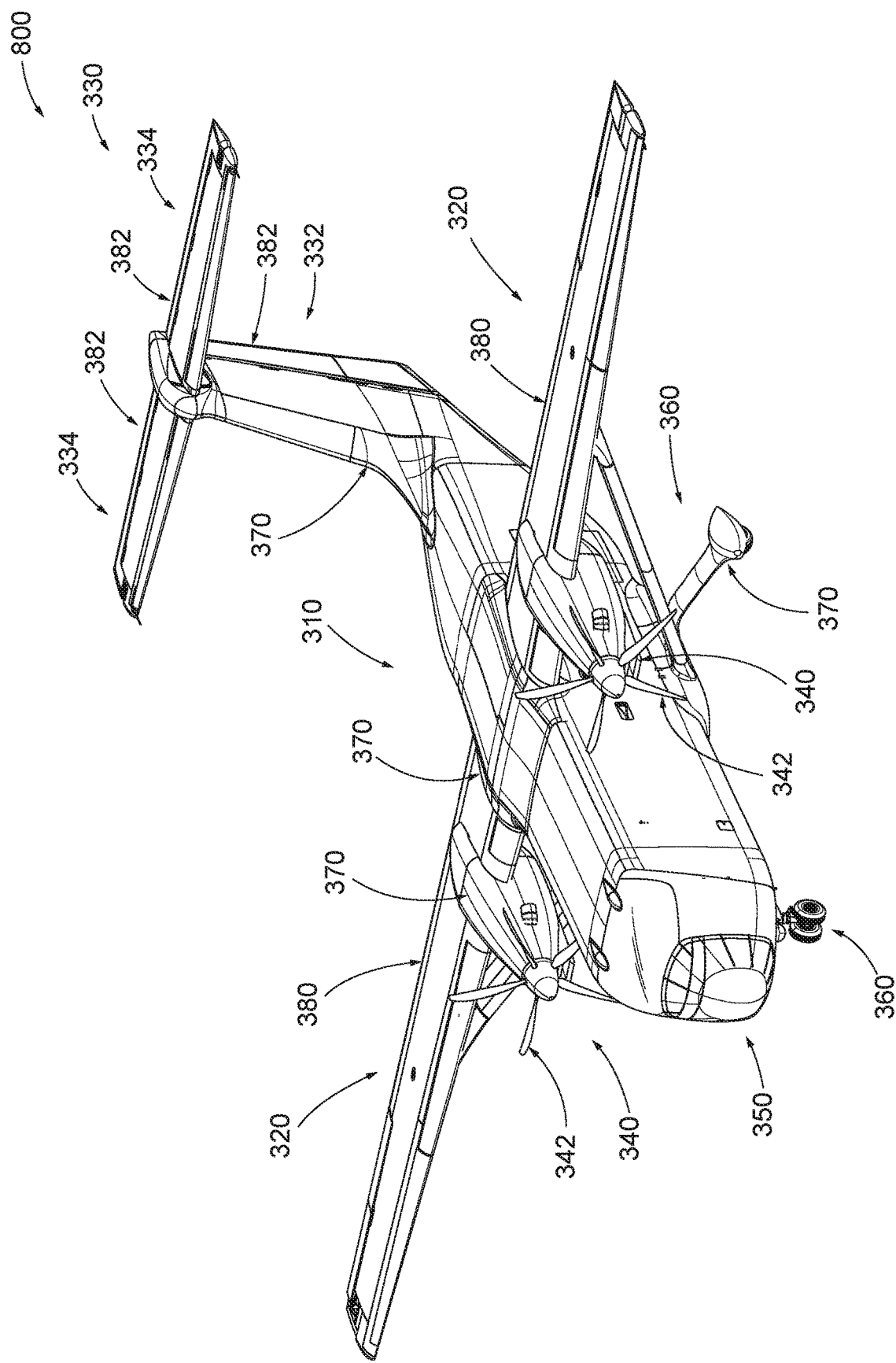
FIG. 1 is a perspective view illustrating examples of an aircraft formed utilizing the systems and/or methods for assembling a containerized aircraft as a complete aircraft, according to the present disclosure.
Figure 2:
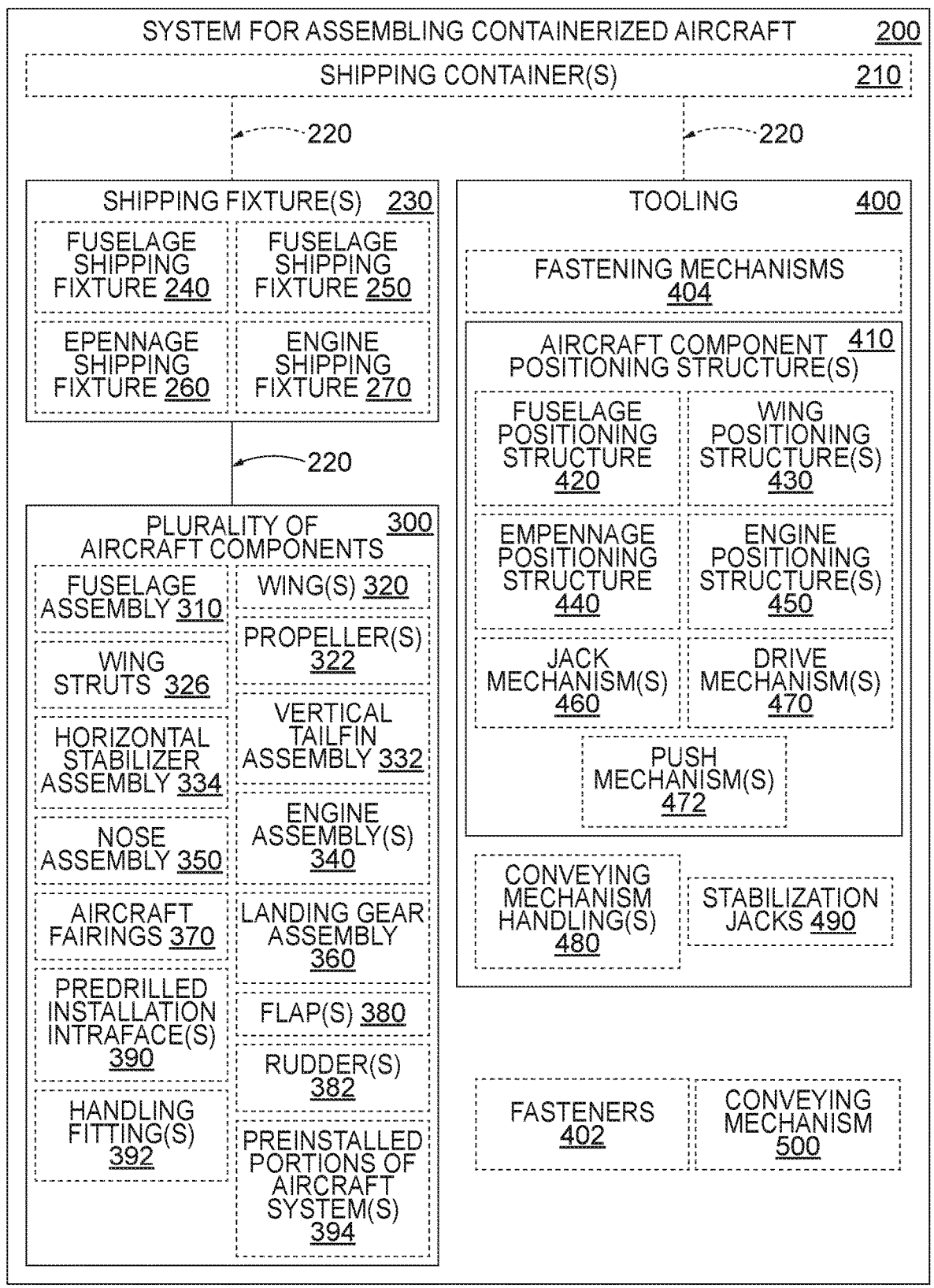
FIG. 2 is a schematic representation depicting examples of systems for assembling a containerized aircraft as a complete aircraft, according to the present disclosure.
Figure 3:
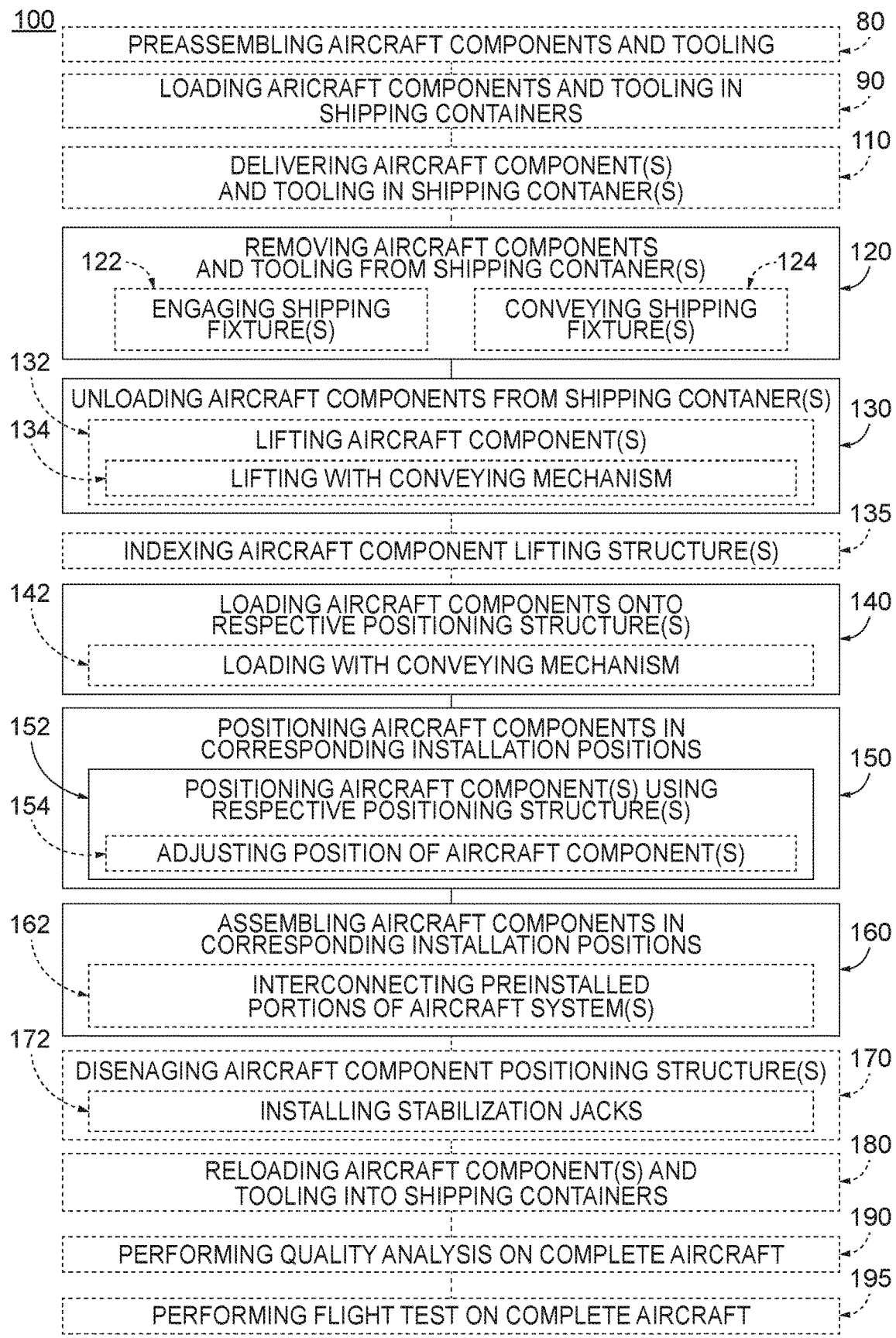
FIG. 3 is a flowchart depicting methods of systems for assembling a containerized aircraft as a complete aircraft, according to the present disclosure.

FIG. 1 illustrates an example of a complete aircraft that may be constructed according the methods disclosed herein and/or utilizing the systems disclosed herein. FIG. 2 provides a schematic representation of examples of systems 200 for assembling a containerized aircraft as a complete aircraft, FIG. 3 provides a flowchart schematically representing methods 100 for assembling the containerized aircraft as the complete aircraft, and FIGS. 4-25 provide somewhat less schematic but still illustrative examples of component parts of systems 200, such as that perform and/or are utilized in connection with the performance of one or more steps of methods 100, and/or structures comprising component parts of systems 200 that are constructed with the performance of one or more steps of methods 100. Elements that serve a similar, or at least substantially similar, purpose are labelled with like numbers in each of FIGS. 1-25, and these elements may not be discussed in detail herein with reference to each of FIGS. 1-25. Similarly, all elements may not be labelled in each of FIGS. 1-25, but reference numerals associated therewith may be utilized herein for consistency. Elements, components, and/or features that are discussed herein with reference to one or more of FIGS. 1-25 may be included in and/or utilized with any of FIGS. 1-25 without departing from the scope of the present disclosure.

Methods 100 are not required to have the schematically represented steps of FIG. 3 performed in the illustrated order. The methods and steps illustrated in FIG. 3 are not limiting and other methods and steps are within the scope of the present disclosure, including methods having greater than or fewer than the number of steps illustrated, as understood from the discussions herein.

FIG. 1 illustrates an example of a complete aircraft 800 that may be constructed according to methods 100 and/or utilizing systems 200. While FIG. 1 illustrates complete aircraft 800 in the form of a fixed wing aircraft, other types and configurations of complete aircraft 800 are within the scope of the present disclosure, including, but not limited to, helicopters. Complete aircraft 800 may comprise a fuselage assembly 310, which generally corresponds to the main body of complete aircraft 800, one or more wings 320, and an empennage assembly 330. As shown, in some examples, empennage assembly 330 includes a vertical tailfin assembly 332 and a horizontal stabilizer assembly 334. Complete aircraft further may comprise a nose assembly 350, one or more engine assemblies 340, one or more flaps 380, one or more rudders 382, and a plurality of aircraft fairings 370. As discussed herein, complete aircraft 800 further may comprise additional and/or alternative components and/or assemblies that are not explicitly illustrated in FIG. 1. For example, fuselage assembly 310 may comprise seats for carrying passengers, stowage compartments, one or more restrooms, and/or a galley, depending on the function of the complete aircraft. As another example, nose assembly 350 may comprise a cockpit having control systems and seating for one or more pilots.

With initial reference to the examples of FIG. 2, systems 200 for assembling the containerized aircraft as the complete aircraft comprise a plurality of aircraft components 300 that are configured to be loaded into one or more shipping containers 210 in a shipping arrangement 220, and one or more shipping fixtures 230 that are configured to support the plurality of aircraft components 300 in the shipping arrangement 220. Each aircraft component 300 is configured to be unloaded from the shipping arrangement 220 and attached to at least one other aircraft component 300 to assemble the plurality of aircraft components 300 as the complete aircraft 800. Systems 200 further comprise tooling 400 configured to facilitate assembly of the plurality of aircraft components 300 as the complete aircraft 800. Tooling 400 is configured to be loaded into and unloaded from the shipping container(s) 210 and comprises one or more aircraft component positioning structures 410. Each aircraft component positioning structure 410 is configured to position at least one respective aircraft component 300 in at least one corresponding aircraft component installation position during assembly of the complete aircraft. Further illustrated in FIG. 2, systems 200 optionally comprise shipping container(s) 210 and a conveying mechanism 500 for conveying tooling 400, shipping fixtures 230, aircraft components 300, and/or combinations thereof during assembly of the complete aircraft.

In some examples, systems 200 comprise a single set of tooling 400 and more than one set of aircraft components 300, to permit more than one complete aircraft 800 to be assembled at a particular assembly location using the single set of tooling 400. As examples, systems 200 may comprise one set of tooling 400 and at least two sets, at least three sets, at least four sets, at least five sets, at least ten sets, and/or at least twenty sets of aircraft components 300.

As referred to herein, the containerized aircraft also may be described as a modular aircraft, a unitized aircraft, a kitted aircraft, and a constructible aircraft. Plurality of aircraft components 300 also may be described as a plurality of interconnectable assemblies, in which each interconnectable assembly is configured to be attached to, connected to, or joined with at least one other interconnectable assembly to comprise a portion of the complete aircraft. For example, as discussed herein, one or more aircraft components 300 may comprise a plurality of preassembled subcomponents that collectively form a complete interconnectable assembly. FIG. 2 schematically illustrates examples of aircraft components 300 such as a fuselage assembly 310, one or more wings 320, a horizontal stabilizer assembly 334, a vertical tailfin assembly 332, one or more engine assemblies 340, and a landing gear assembly 360. In some examples, plurality of aircraft components 300 further comprises one or more wing struts 326, a plurality of aircraft fairings 370, one or more flaps 380, one or more rudders 382, one or more propellers 342, and/or a nose assembly 350. While FIG. 2 illustrates each specific aircraft component 300 as being an individual, or a discrete assembly, it is within the scope of the present disclose that any subset of aircraft components 300 illustrated in FIG. 2 may be preassembled prior to assembly of the containerized aircraft. For example, nose assembly 350 may be preassembled with fuselage assembly 310. Likewise, wing(s) 320 may be preassembled with flap(s) 380, and engine assembly(s) 340 may be preassembled with propeller(s) 342.

With continued reference to FIG. 2, in some examples, at least some of the aircraft components 300 comprise at least one predrilled installation interface 390, in which each predrilled installation interface 390 is configured to be selectively joined with at least one other predrilled installation interface 390 to permit drilling-free attachment of two or more respective aircraft component(s) 300. In such examples, predrilled installation interfaces 390 may enhance the precision with which the two or more respective aircraft components 300 are attached and/or reduce the tooling required for assembling aircraft components 300.

In some examples, at least a subset of aircraft components 300 comprise interconnectable preinstalled portions of one or more aircraft systems 394, in which the interconnectable preinstalled portions of each aircraft system 394 are configured to be interconnected to form a complete aircraft system. The interconnectable preinstalled portions of each aircraft system 394 are configured to be interconnected during assembly of the aircraft by any suitable mechanism. In some examples, preinstalled portions of a given aircraft system 394 comprise one or more quick connects that are configured to interconnect with one or more quick connects comprised in one or more other preinstalled portions of the given aircraft system 394. In such examples, the quick connects may facilitate facile and precision assembly of a given complete aircraft system. Examples of complete aircraft systems include electronic systems, hydraulic systems, mechanical systems, hydro-mechanical systems, electromechanical systems, fuel systems, and/or combinations thereof. In such examples, each complete aircraft system is configured to facilitate one or more aspects of aircraft control and/or aircraft operation, with illustrative, non-exclusive examples including flap control, rudder control, elevator control, communications control, engine control, and fuel supply. For example, when the plurality of aircraft components 300 comprises one or more wings 320 and one or more flaps 380, wing(s) 320 and flap(s) 380 may comprise interconnectable preinstalled portions of a mechanical system that are interconnected to form a complete mechanical system for actuating, or controlling flap(s) 380. In some examples, one or more aircraft components 300 and/or interconnectable preinstalled portions of aircraft system(s) 394 are pretested and/or pre-certified, such that aircraft component testing and/or certification is not required during assembly of the plurality of aircraft components 300.

As further shown in FIG. 2, in some examples one or more aircraft components 300 comprise one or more handling fittings 392 that are configured to releasably engage with conveying mechanism 500 and/or a conveying mechanism handle(s) 480 to facilitate removing, unloading, loading, and/or positioning of the respective aircraft component 300. Handling fitting(s) 392 comprise any suitable structure for releasably engaging an aircraft component 300 with conveying mechanism 500 or conveying mechanism handle(s) 480, such as a D-ring, a closed loop, a hook, a slot, and/or a lip.

FIG. 2 further illustrates specific examples of shipping fixture(s) 230 comprising systems 200. As defined herein, shipping fixture(s) 230 comprises any suitable structure for supporting aircraft components 300 and/or tooling 400 in shipping arrangement 220. In some examples, shipping fixture(s) 230 comprise one or more discrete structures, in which each shipping fixture 230 is configured to support at least a portion of aircraft component(s) 300 and/or a portion of tooling 400. Additionally or alternatively, in some examples, shipping fixture(s) 230 comprise shipping container(s) 210. In such examples, one or more aircraft components 300 and/or tooling 400 are directly supported by shipping container(s) 210 in shipping arrangement 220. As shown, examples of shipping fixture(s) 230 comprise one or more of a fuselage shipping fixture 240, a wing shipping fixture 250, an empennage shipping fixture 260, and an engine shipping fixture 270. While the examples schematically represented in FIG. 2 indicate each of the above specific shipping fixtures 230 as being configured to support a single or specific aircraft component 300, in many examples, at least one shipping fixture 230 is configured to simultaneously support at least two, at least three, at least four, at least five, and/or at least ten aircraft components 300 in shipping arrangement 220.

Shipping container(s) 210 may be described as standard shipping container(s) 210, or intermodal container(s) 210 that configured for that are configured for transport via one or more of rail, truck, ship, and/or plane. Shipping container(s) 210 may include any suitable dimensions for containerizing systems 200. Examples of suitable dimensions of shipping container 210 include an external height of 2 meters, 2.6 meters, or 2.9 meters, an external width of 2 meters, 2.4 meters, or 2.6 meters, and/or an external length of 6.1 meters, 12.2 meters, 13.7 meters, 14.6 meters, or 16.2 meters.

With continued reference to the examples of FIG. 2, systems 200 further comprise tooling 400 that is configured to facilitate assembly of the plurality of aircraft components 300 as the complete aircraft 800. In some examples, tooling 400 is configured to be manually operated, such that assembly of the complete aircraft 800 may be performed with tooling 400 independently of computer aided systems. In some examples, tooling 400 is configured to facilitate assembly of the complete aircraft in a plurality of assembly environments, in which each assembly environment comprises one or more assembly surfaces. Stated another way, tooling 400 may be described as being adaptable to facilitate assembly of the complete aircraft in a wide array of assembly environments and/or on a wide array of assembly surfaces. Examples of assembly environments include one or more of an indoor assembly environment, an outdoor assembly environment, an airfield, and/or an unsupported assembly environment. As defined herein, unsupported assembly environment refers to any assembly environment in which traditional assembly fixtures, such as overhead cranes and permanent lifts, are not necessarily available. Examples of assembly surfaces include one or more of an uneven assembly surface, a concrete assembly surface, a dirt assembly surface, a grassy assembly surface, an unfinished assembly surface, and/or a wet assembly surface.

As schematically represented in FIG. 2, tooling 400 comprises one or more aircraft component positioning structures 410. Aircraft component positioning structure(s) 410 also may be referred to herein as positioning structure(s), supporting structure(s), positioning fixture(s), aircraft component positioning fixture(s), aircraft component support frame(s), and/or aircraft component orienting fixture(s). Stated in slightly different terms, each aircraft component positioning structure 410 is configured to support and position one or more respective aircraft components 300 during assembly of the complete aircraft. Examples of aircraft component positioning structure(s) 410 include one or more of a fuselage positioning structure 420, one or more wing positioning structures 430, an empennage positioning structure 440, and/or one or more engine positioning structures 450. While the above examples indicate each aircraft component positioning structures 410 as being configured to position a particular aircraft component 300, in some examples, one or more aircraft component positioning structures 410, or portions thereof, are configured to position more than one aircraft component 300. As discussed in more detail herein with respect to methods 100, in some examples, empennage positioning structure 440 is configured to position vertical tailfin assembly 332, horizontal stabilizer assembly 334, and empennage assembly 330. As another example, jack mechanism(s) 460 comprising engine positioning structure(s) 450 also may be utilized in positioning fuselage assembly 310. Additionally or alternatively, one or more shipping fixtures 230 are utilized as aircraft component positioning structure(s) 410 and/or portions of aircraft component positioning structure(s) 410. As further illustrated in FIG. 2, in some examples, tooling 400 further comprises one or more stabilization jacks 490 configured to stabilize one or more aircraft components 300, such as, when aircraft component(s) 300 are not being supported by a respective aircraft component positioning structure 410.

Each aircraft component positioning structure 410 is configured to position at least one respective aircraft component 300 in the corresponding aircraft component installation position during assembly of the aircraft. In some examples, in order to adequately position aircraft component 300 in the corresponding installation position, it is desirable to perform positional adjustments on aircraft component 300 utilizing the respective aircraft component positioning structure 410. With this in mind, in some examples, one or more aircraft component position structures 410 comprise one or more jack mechanisms 460 and/or one or more drive mechanisms 470 that are configured to facilitate the positional adjustments. In some such examples, jack mechanism(s) 460 and/or drive mechanism(s) 470 that comprise a particular aircraft component positioning structure 410 are configured to be disengaged from the particular aircraft component positioning structure 410 and utilized in a different aircraft component positioning structure 410.

In some examples, systems 200 further comprise a plurality of fasteners 402 that are utilized to attach aircraft components 300. Additionally or alternatively, tooling 400 comprises a plurality of fastening mechanisms 404 configured to facilitate attachment of aircraft components 300, optionally with fasteners 402. As discussed herein, fasteners 402 are defined as any suitable structure and/or combination of structures that adequately attach two or more aircraft components 300. In some examples, one or more aircraft components 300 comprise one or more fasteners 402 and/or portions of fasteners 402. Fasteners 402 that are utilized to attach any set of aircraft components 300 may be the same as or different from fasteners 402 that are utilized to attach a different set of aircraft components 300. Fastening mechanisms 404 are defined herein as any suitable mechanism for attaching two or more aircraft components 300 and may be utilized in connection with fasteners 402 or independently of fasteners 402. Examples of fastening mechanisms 404 include hand tools, pneumatically driven hand tools, wrenches, drivers, welding machinery, riveters, swaggers, clamps, presses, pliers, vices, and/or crimpers.

As schematically represented in FIG. 2, in some examples, systems 200 further comprises a conveying mechanism 500 that is configured to convey a plurality of aircraft components 300, shipping fixture(s) 230, shipping container(s) 210, and/or tooling 400 during assembly of the complete aircraft 800. In some examples, conveying mechanism 500 is configured to unload one or more aircraft components 300 from one or more respective shipping fixtures 230. Additionally or alternatively, conveying mechanism 500 may be configured to unload shipping fixture(s) 230 and/or tooling 400 from shipping container(s) 210. As yet more examples, conveying mechanism 500 may be configured to load one or more aircraft components 300 onto one or more respective aircraft component positioning structure(s) 410, and/or position one or more aircraft components 300 during assembly of the complete aircraft. As discussed in more detail herein with respect to methods 100, in some examples, conveying mechanism 500 comprises a forklift 510 or any other user-operated machinery configured to facilitate removing, unloading, loading, and/or positioning of component parts of systems 200. For any example in which tooling 400 comprises conveying mechanism 500, tooling 400 further may comprise one or more conveying mechanism handles 480 that each are configured associate with conveying mechanism 500 and releasably engage with one or more respective handling fittings 392 comprised in one or more aircraft components 300, one or more shipping fixtures 230, and/or one or more aircraft component positioning structures 410. Conveying mechanism handle(s) 480 comprise any suitable structure for releasably engaging handling fitting(s) 392 such as one or more of a hook, a loop, a chain, a strap, a boom, a latch, a clamp, and/or a slot receiver. Alternatively, shipping fixture(s) 230, tooling 400, and/or aircraft components 300 may be configured to releasably engage with conveying mechanism 500 without requiring handling fittings 392 and/or conveying mechanism handles 480. Stated in slightly different terms, in some examples, shipping fixture(s) 230, tooling 400, and/or aircraft components 300 are configured to releasably engage with any generic conveying mechanism that may be provided at an assembly location such as to perform any steps of methods 100 that utilize conveying mechanism 500. It also is within the scope of the present disclosure that conveying mechanism 500 may comprise a plurality of conveying mechanisms 500, such as a plurality of forklifts 510.

Turning now to the examples schematically represented in FIG. 3, but with continued reference to FIG. 2, methods 100 for assembling the plurality of aircraft components as the complete aircraft comprise removing the plurality of aircraft components and the tooling from the shipping containers at 120, unloading the plurality of aircraft components from one or more shipping fixtures at 130, and loading one or more aircraft components onto one or more respective aircraft component positioning structures at 140. Methods 100 further comprise positioning the plurality of aircraft components in the corresponding aircraft component installation positions at 150, which comprises positioning the one or more aircraft components in the corresponding aircraft component installation positions using the one or more respective aircraft component positioning structures at 152. Methods 100 yet further comprise assembling the plurality of aircraft components in the corresponding aircraft component installation positions at 160, which comprises attaching each aircraft component to at least one other aircraft component at 162.

To more clearly illustrate the steps of methods 100 that are schematically represented in FIG. 3, the following discussion makes reference to the specific examples illustrated in FIGS. 4-25. While many of the examples of FIGS. 4-25 illustrate specific component parts of systems 200 and/or structures comprising specific component parts of systems 200 that are utilized and/or constructed in connection with performing one or more steps of methods 100, the one or more steps represented in each of FIGS. 4-25 may be performed in connection with one or more different component parts of systems 200 without departing from the scope of the present disclosure. Additionally, while methods 100 comprise steps that are schematically represented in FIG. 3 as being performed in connection with more than one aircraft component, methods 100 do not require any given step be performed in connection with more than one aircraft component simultaneously, and more than one step of methods 100 may be performed in connection with an individual aircraft component independently of any other aircraft component. For example, while FIG. 3 indicates removing the aircraft components from the shipping container(s) at 120, and unloading the aircraft components from the shipping fixture(s) at 130, methods 100 may include removing and/or unloading one or more aircraft components before or after all other aircraft components are removed and/or unloaded from the shipping container(s).

As shown in FIG. 3, in some examples, methods 100 comprise preassembling the aircraft components and the tooling at 80. The preassembling at 80 may be performed prior to any other step of methods 100. In some examples, the preassembling at 80 comprises preassembling one or more subcomponents that define a given aircraft component 300 of systems 200. The preassembling at 80 also may comprise installing preinstalled portions of aircraft systems 394 in two or more aircraft components 300. Additionally or alternatively, the preassembling at 80 comprises forming predrilled installation interfaces 390 in two or more aircraft components 300. As yet more examples, the preassembling at 80 further may comprise preassembling one or more aircraft component positioning structures 410. In some examples, the preassembling at 80 is performed at a single pre-fabrication location, and in other examples the preassembling at 80 is performed at multiple pre-fabrication locations.

Referring again to FIG. 3, methods 100 also may comprise loading the tooling and the aircraft components at 90. The loading at 90 may be performed prior to the delivering at 110 and/or subsequent to the preassembling at 80. In some examples, the loading at 90 comprises loading aircraft components 300 onto shipping fixture(s) 230 in shipping arrangement 220. In some examples, the loading at 90 comprises loading tooling 400 onto shipping fixture(s) 230 in shipping arrangement 220. The loading at 90 further may comprise loading aircraft components 300 and tooling 400 into shipping container(s) 210. In some examples, the loading at 90 is performed at a pre-fabrication location where aircraft components 300 and/or tooling are preassembled. Additionally or alternatively, the loading at 90 may be performed at a delivery location, which may be the same as or different from the pre-fabrication location. As a more specific example, for examples in which the preassembling at 80 is performed at multiple pre-fabrication locations, the delivery location may correspond to one of the pre-fabrication locations and/or may be separate from any of the pre-fabrication locations. In some examples, the loading at 90 is performed by the same party that performs the preassembling at 80.

As shown in FIG. 3, methods 100 optionally comprise delivering the tooling and aircraft components in the one or more shipping containers at 110. The delivering at 110 may be performed subsequent to the preassembling at 80, subsequent to the loading at 90, and/or prior to any other step of methods 100. In some examples, the delivering at 110 comprises shipping, or delivering, the one or more shipping containers from the pre-fabrication location, in which one or more of the aircraft components are formed and/or preassembled, to the assembly location. Additionally or alternatively, the delivering at 110 comprises delivering the one or more shipping containers to the delivery location. In any such examples, the delivering at 110 additionally or alternatively comprises delivering systems 200 to a location of a customer. In some examples, shipping containers 210 are owned by the same party that performs the preassembling at 80 and/or the loading at 90. Alternatively, shipping containers 210 are owned by a third party, such as a freight or shipping company.

As discussed in more detail herein, the delivering at 110 comprises delivering the tooling and the aircraft components in the shipping arrangement and any suitable number of shipping containers may be utilized to house and/or support the tooling and the aircraft components in the shipping arrangement. For some examples in which systems 200 comprise conveying mechanism 500, conveying mechanism 500 is provided and/or available at the assembly location. Thus, in such examples, the delivering at 110 does not comprise delivering conveying mechanism 500. Having conveying mechanism 500 at the assembly location may be desirable to reduce weight and/or space requirements for the delivering at 110. Moreover, a customer of a system 200 may readily have available one or more suitable conveying mechanisms 500. For other examples in which systems 200 comprise conveying mechanism 500, conveying mechanism 500 is delivered along with tooling 400 and aircraft components 300 in shipping containers 210.

In some examples, one or more of steps 110-195 of methods 100 are performed by and/or overseen by one or more authorized personnel at the assembly location. Thus, in some examples, the delivering at 110 comprises sending the one or more authorized personnel to the assembly location, which may be performed separately from delivering the tooling and the aircraft components. In some examples, the one or more authorized personnel are employed by the party that performs the preassembling at 80, the loading at 90, and/or the delivering at 110, and/or that sells, leases, and/or otherwise delivers a system 200 to a customer. Additionally or alternatively, the one or more authorized personnel are trained by and/or authorized by the same party that performs the preassembling at 80, the loading at 90, and/or the delivering at 110 to assemble the complete aircraft, and/or that sells, leases, and/or otherwise delivers a system 200 to a customer.

Figure 4:
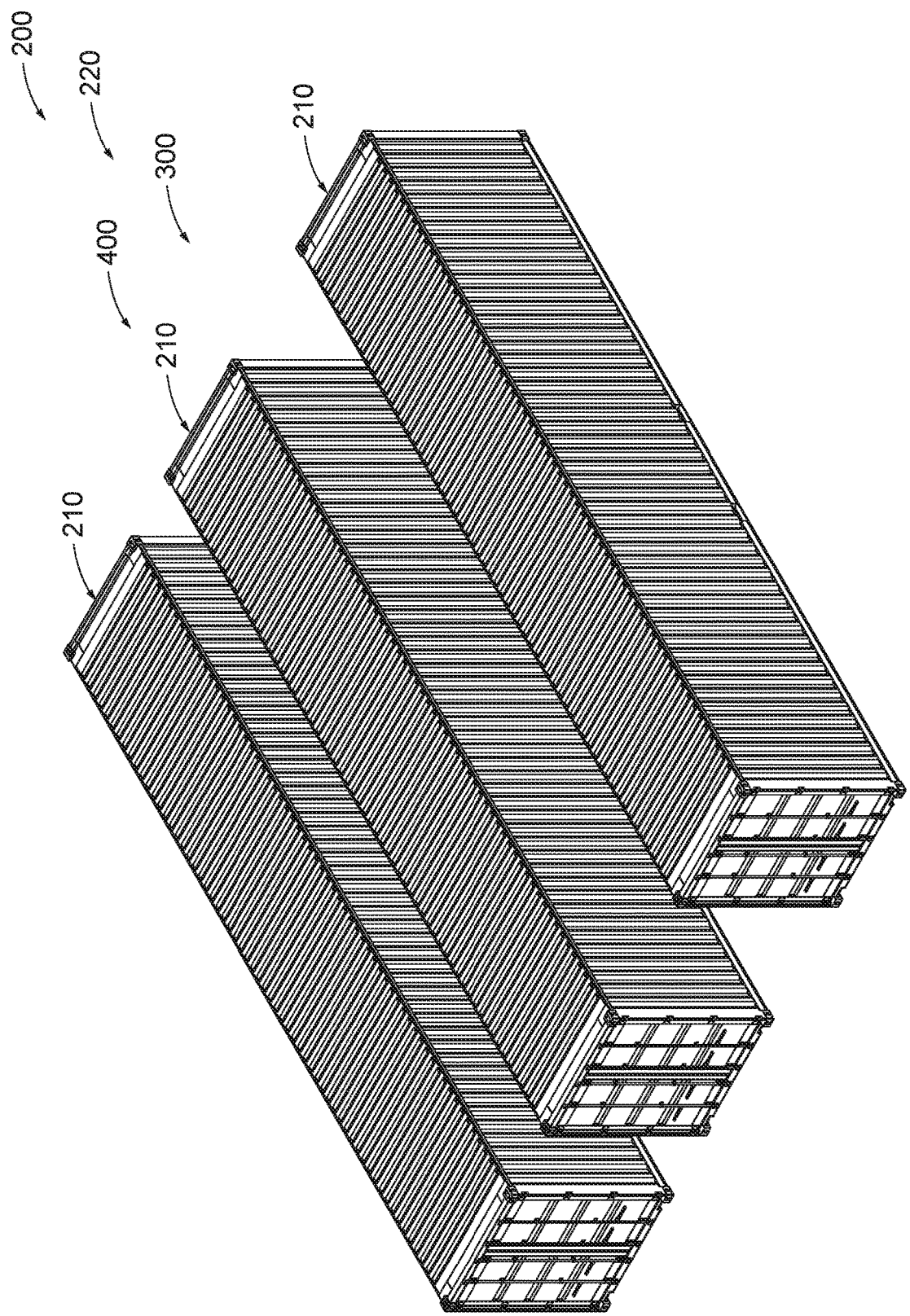
FIG. 4 is a somewhat less schematic illustration depicting an example of tooling and aircraft components in a shipping arrangement.

Turning to FIG. 4, illustrated is an example of tooling 400 and plurality of aircraft components 300 loaded into shipping container(s) 210 in shipping arrangement 220. While FIG. 4 illustrates an example in which aircraft components and tooling 400 are loaded into three shipping containers 210, it is within the scope of the present disclosure that tooling 400 and aircraft components 300 may be configured to be loaded into and unloaded from any suitable number of shipping containers 210, with examples including at most 1 shipping container, at most 2 shipping containers, at most 4 shipping containers, at most 5 shipping containers, at most 10 shipping containers, at least 10 shipping containers, at least 15 shipping containers, and/or at least 20 shipping containers.

Referring back to the examples schematically represented in FIG. 3, methods 100 comprise removing the aircraft components and the tooling from the shipping containers at 120. In some examples, the removing at 120 comprises engaging one or more shipping fixtures with the conveying mechanism at 122 and conveying the one or more shipping fixtures from the one or more shipping containers at 124 to remove at least a portion of the plurality of aircraft components and/or at least a portion of the tooling from the one or more shipping containers.

Figure 5:
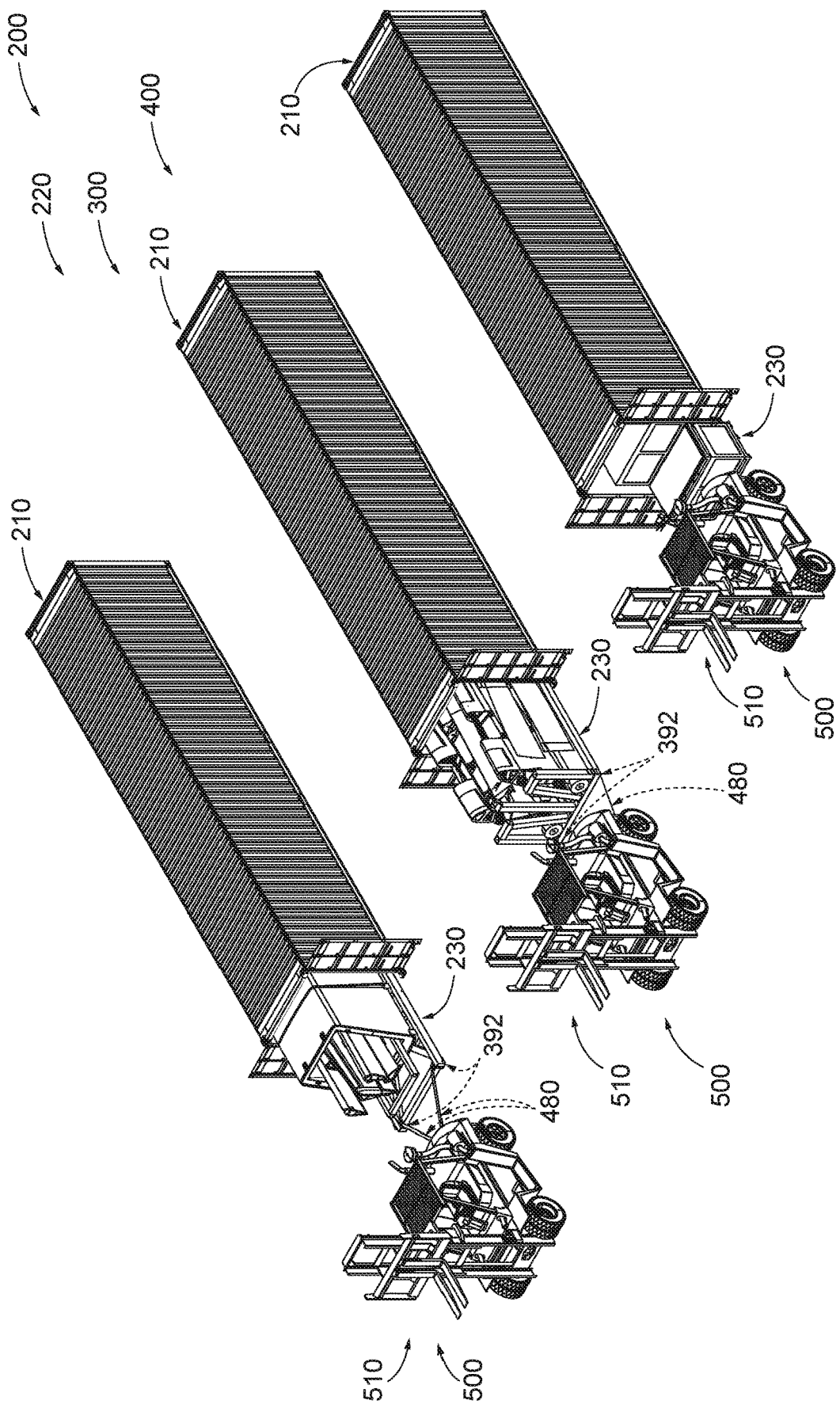
FIG. 5 illustrates specific examples of removing aircraft components and tooling from shipping containers.

FIG. 5 illustrates less schematic, yet still illustrative, examples of the removing at 120. In the examples illustrated in FIG. 5, conveying mechanism 500 comprises three forklifts 510 and each shipping fixture 230 supports a portion of the plurality of aircraft components 300. While FIG. 5 illustrates examples in which three separate forklifts 510 are utilized to convey three separate shipping fixtures 230 from three shipping containers 210, as discussed herein, it within the scope of the present disclosure that systems 200 may include a single forklift 510, and each shipping fixture 230 is conveyed from a shipping container 210 utilizing a single forklift 510. As shown in FIG. 5, the engaging at 122 comprises engaging each shipping fixture 230 with a forklift 510, and the removing 120 comprising conveying 124 each shipping fixture 230 with a forklift 510 from a shipping container 210 to remove the portion of aircraft components 300 that are supported on the shipping fixture 230 from the shipping container 210. Further shown in the examples of FIG. 5, shipping fixtures 230 optionally comprise handling fitting(s) 392 that are configured to engage with conveying mechanism 500 and/or conveying mechanism handle 480 during the removing at 120.

Figure 6:
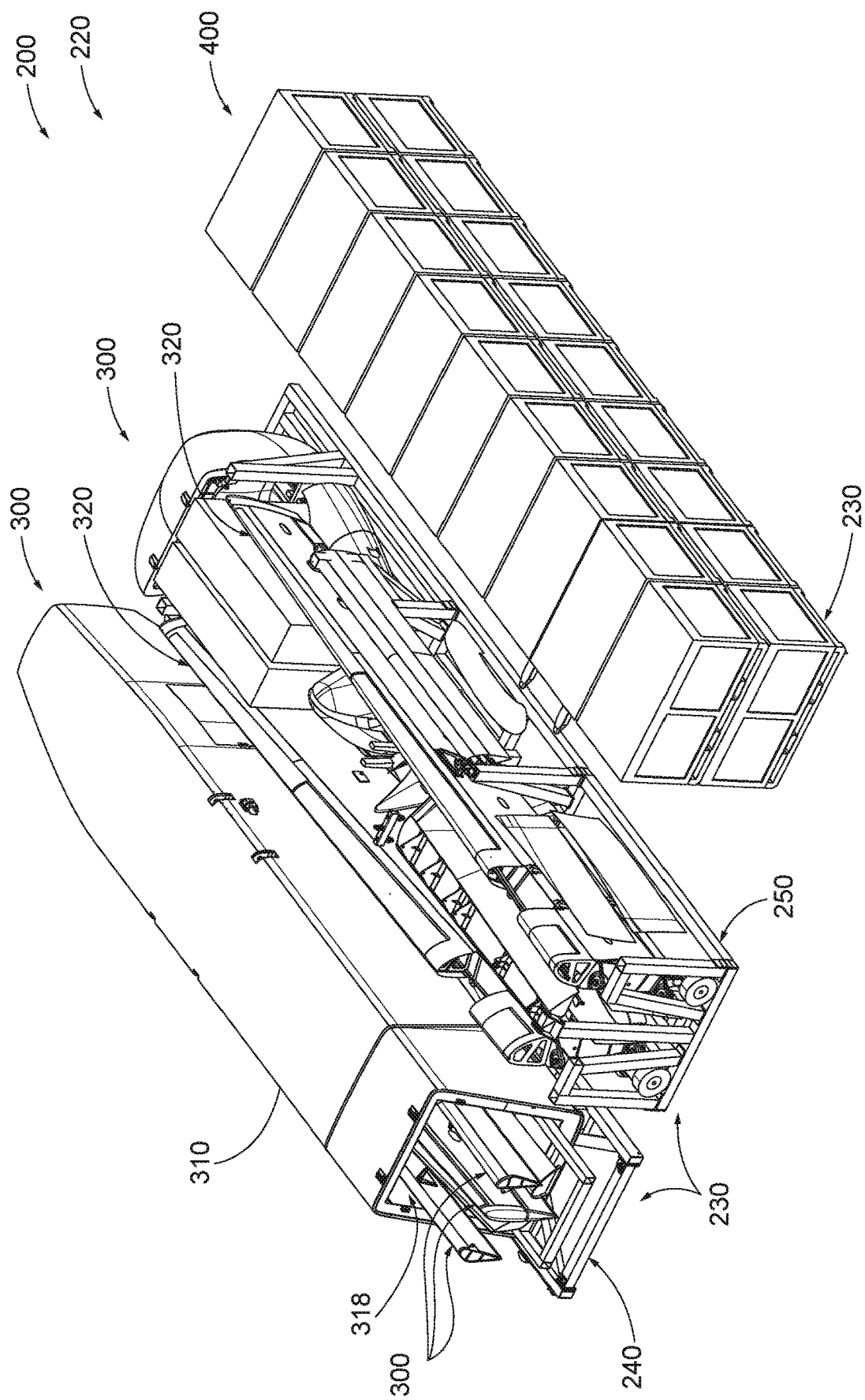
FIG. 6 illustrates a specific example of the tooling and the aircraft components in the shipping arrangement.

FIG. 6 provides an illustrative example of the plurality of aircraft components 300 and tooling 400 in shipping arrangement 220 prior to and/or following the removing at 120. As shown, shipping fixtures 230 are configured to support aircraft components 300 and tooling 400 in shipping arrangement 220, in which aircraft components 300 and tooling 400 are arranged to be loaded into, unloaded from, and/or transported in shipping container(s) 210. In the specific example illustrated in FIG. 6, shipping arrangement 220 comprises a plurality of aircraft components 300 supported on two shipping fixtures 230 and at least a portion of tooling 400 is supported on a third shipping fixture 230. More specifically, in the example shown, a fuselage shipping fixture 240 supports fuselage assembly 310, and a wing shipping fixture 250 supports wing(s) 320. Further illustrated in FIG. 6, in some examples, fuselage assembly 310 comprises an open internal volume 318, and one or more aircraft components 300 are received within open internal volume 318 in shipping arrangement 220.

While FIG. 6 illustrates an example of shipping arrangement 220 in which plurality of aircraft components 300 are supported on at least two shipping fixtures 230 and tooling 400 is supported on a third shipping fixture 230, it is within the scope of the present disclosure that systems 200 comprise any suitable number of shipping fixtures 230, and aircraft components 300 and tooling 400 may be supported by shipping fixture(s) 230 in any suitable set of combinations and/or divisions in shipping arrangement 220. For example, in some examples, systems 200 comprise a single shipping fixture 230 that supports both tooling 400 and the plurality of aircraft components 300. Alternatively, systems 200 may comprise at least 2, at least 4, at least 8, at least 10, at least 20, at most 2, at most 3, at most 4, at most 5, at most 8, at most 10, and/or at most 20 shipping fixtures 230 for supporting plurality of aircraft components 300 and/or tooling 400 in the shipping arrangement.

Figure 7:
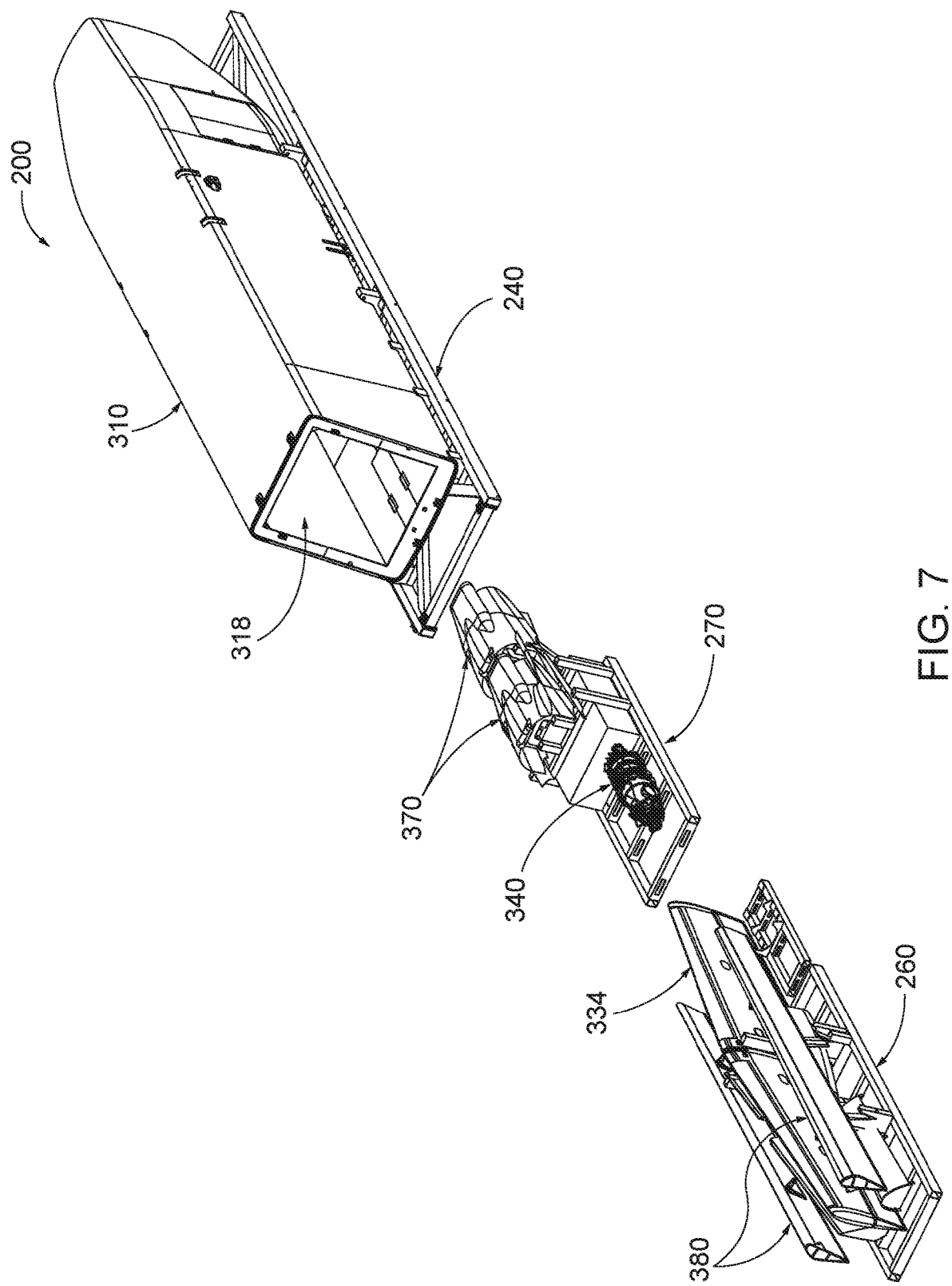
FIG. 7 is an exploded view illustrating an example of a portion of the aircraft components in the shipping arrangement.
Figure 8:
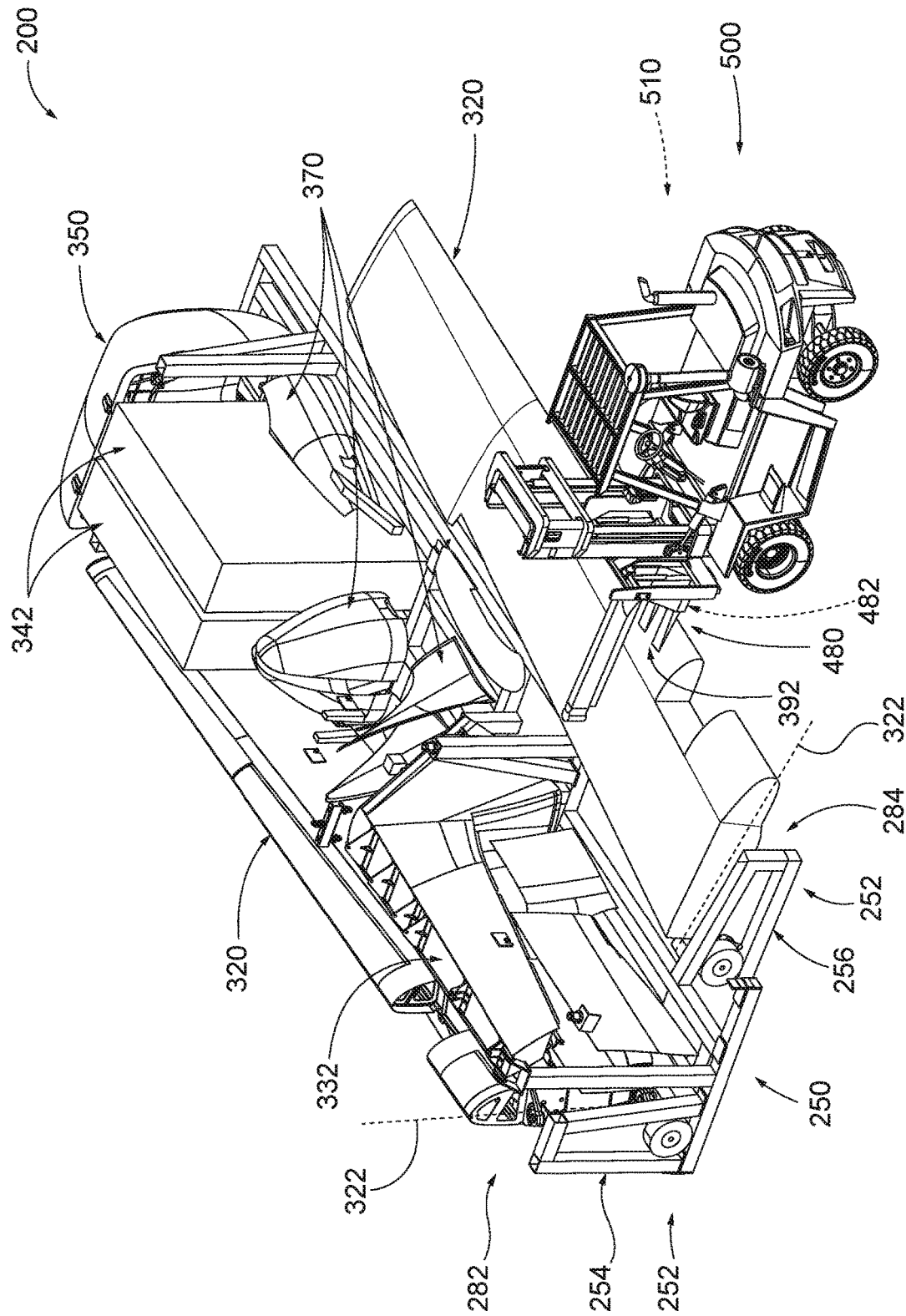
FIG. 8 illustrates a specific example of features of a wing shipping fixture and portions of systems that may be utilized in unloading.
Figure 9:
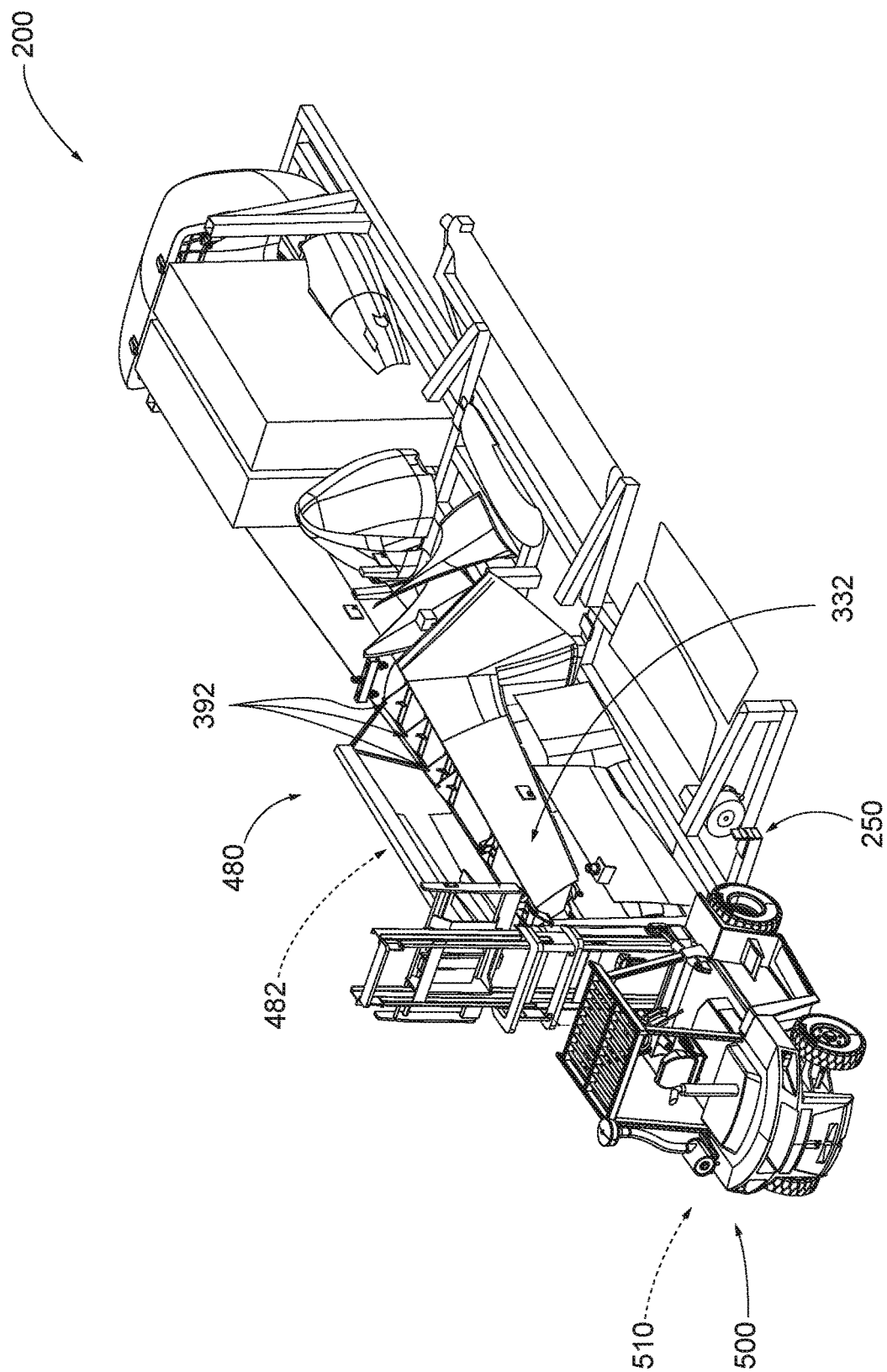
FIG. 9 illustrates a specific example of features of a wing shipping fixture and portions of systems that may be utilized in unloading.

FIGS. 7-9 provide more detailed examples of portions of shipping arrangement 220. FIG. 8 illustrates an example of aircraft components 300 that may supported on wing shipping fixture 250. As shown in this example, in addition to wing(s) 320, in some examples, wing shipping fixture 250 is configured to support vertical tailfin assembly 332, nose assembly 350, at least a portion of aircraft fairings 370, and propellers 342. Now referring to the exploded view illustrated in FIG. 7, in some examples, engine assembly(s) 340 and a portion of the plurality of aircraft fairings 370 are supported on an engine shipping fixture 270, and horizontal stabilizer assembly 334, at least a portion of aircraft fairings 370, and flap(s) 380 are supported on empennage shipping fixture 260. As shown in this example, empennage shipping fixture 260 and engine shipping fixture 270, together with the respectively supported aircraft components 300, are configured to be received within open internal volume 318 of fuselage assembly 310.

Turning back to the examples schematically represented in FIG. 3, methods 100 further comprise unloading the plurality of aircraft components from the one or more shipping fixtures at 130. The unloading is performed in any suitable manner such that each aircraft component is adequately unloaded from the one or more shipping fixtures. The unloading at 130 may be performed subsequent to the removing at 120, substantially simultaneously with the removing at 120, prior to the loading at 140, and/or prior to the positioning at 150. As an example, the unloading at 130 may be performed substantially simultaneously with the removing at 120 for examples in which the shipping arrangement comprises one or more aircraft components directly supported by one or more shipping containers. Additionally or alternatively, the unloading at 130 may be performed subsequent to the removing at 120 for examples in which the shipping arrangement comprises one or more aircraft components supported by a shipping fixture that comprises a discrete support structure.

With continued reference to FIG. 3, in some examples, the unloading at 130 comprises lifting one or more aircraft components from one or more respective shipping fixtures at 132. In some such examples, the lifting is performed with the conveying mechanism at 134. FIGS. 8-9 provide more specific illustrative examples of the unloading at 130, the lifting at 132, 134 and component parts of systems 200 utilized and/or unloaded in connection with these steps. More specifically, FIG. 8 illustrates examples of features of wing shipping fixture 250, wings 320, conveying mechanism 500, and conveying mechanism handle(s) 480 that may be utilized during the unloading at 130, the lifting at 132, and/or the lifting at 134. In the examples shown, wing shipping fixture 250 comprises one or more hinged wing support members 252, in which each hinged wing support member 252 is configured to operatively support a wing 320 and pivot between a shipping orientation 282 and an unloading orientation 284. In the specific examples illustrated in FIG. 8, wing shipping fixture 250 comprises a first hinged wing support member 254 positioned in the shipping orientation 282 and a second hinged support member 256 positioned in unloading orientation 284. In shipping orientation 282, hinged wing support member 252 is configured to support wing 320 with a chord 322 of wing 320 oriented upwardly (i.e., generally vertically). In unloading orientation 284, hinged wing support member 252 is configured to support wing 320 with chord 322 of wing 320 oriented outwardly (i.e., generally horizontally). Further illustrated in the examples of FIG. 8, wings 320 comprise one or more handling fittings 392 that are configured to engage with one or more respective conveying mechanism handles 480 associated with conveying mechanism 500. In some of the examples represented in FIG. 8, conveying mechanism 500 comprises forklift 510, and conveying mechanism handle(s) 480 comprises forklift boom handle(s) 482. Thus, in the examples shown, unloading 130 wing(s) 320 comprises pivoting hinged wing support member(s) 252 from shipping orientation 282 to unloading orientation 284, releasably engaging handling fitting(s) 392 with conveying mechanism handle(s) 480, which optionally comprises forklift boom handle(s) 482, and lifting wings 320 from wing shipping fixture with conveying mechanism 500, which optionally comprises forklift 510.

FIG. 9 illustrates specific examples of features of conveying mechanism 500, conveying mechanism handle(s) 480, and vertical tailfin assembly 332 that may be utilized during the unloading at 130, the lifting at 132, and/or the lifting at 134. In the examples shown, vertical tailfin assembly 332 comprises one or more handling fittings 392 that are configured to engage with conveying mechanism handle(s) 480, and vertical tailfin assembly 332 is supported by wing shipping fixture 250 such that handling fitting(s) 392 are accessible to conveying mechanism 500. In some of the examples of FIG. 9, conveying mechanism 500 comprises forklift 510, and conveying mechanism handle(s) 480, which optionally comprise forklift boom handle(s) 482, are associated with conveying mechanism 500. Thus, in such examples, unloading 130 vertical tailfin assembly 332 comprises engaging handling fitting(s) 392 of vertical tailfin assembly 332 with conveying mechanism handle(s) 480, which optionally comprise forklift boom handle(s) 482, and lifting vertical tailfin assembly 332 from wing shipping fixture 250 with conveying mechanism 500, which optionally comprises forklift 510.

While FIGS. 8-9 illustrate specific examples of unloading 130 and lifting 132, 134 of wing(s) 320 and vertical tailfin assembly 332, it is within the scope of the present disclosure that similar steps may be performed to unload other aircraft components 300.

Turning back to FIG. 3 and with continued reference to FIG. 2, in some examples, methods 100 comprise indexing one or more aircraft component positioning structures to the fuselage positioning structure at 135. The indexing at 135 is performed to facilitate proper placement of the one or more aircraft component positioning structures during assembly of the complete aircraft. The indexing at 135 may be performed subsequent to the removing at 120, subsequent to the unloading at 130, subsequent to the loading at 140, prior to the loading at 140, and/or prior to the positioning at 150. In some examples, the fuselage positioning assembly and at least one other aircraft component positioning structure each comprise a base structure that is configured to support the aircraft component positioning structure on the assembly surface. In some such examples, the indexing at 135 comprises engaging a portion of the base structure of an aircraft component positioning structure and the base structure of the fuselage positioning structure. In some such examples, the base structures of the fuselage positioning structure and the aircraft component positioning structure each comprise a laterally extending track, and in such examples, the laterally extending tracks are engaged during the indexing at 135.

Figure 10:
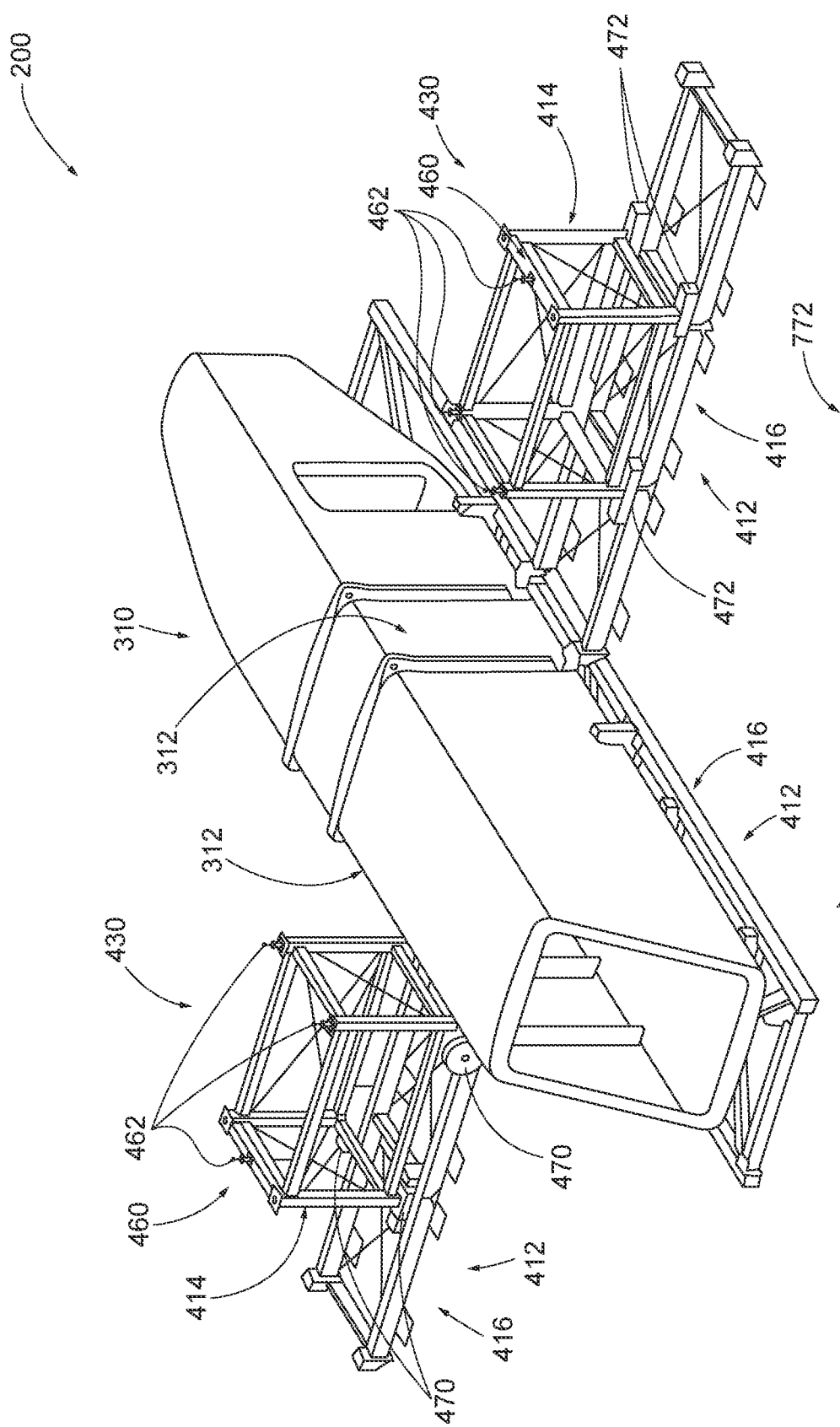
FIG. 10 illustrates an example of wing positioning structures indexed to the fuselage positioning structure.
Figure 11:
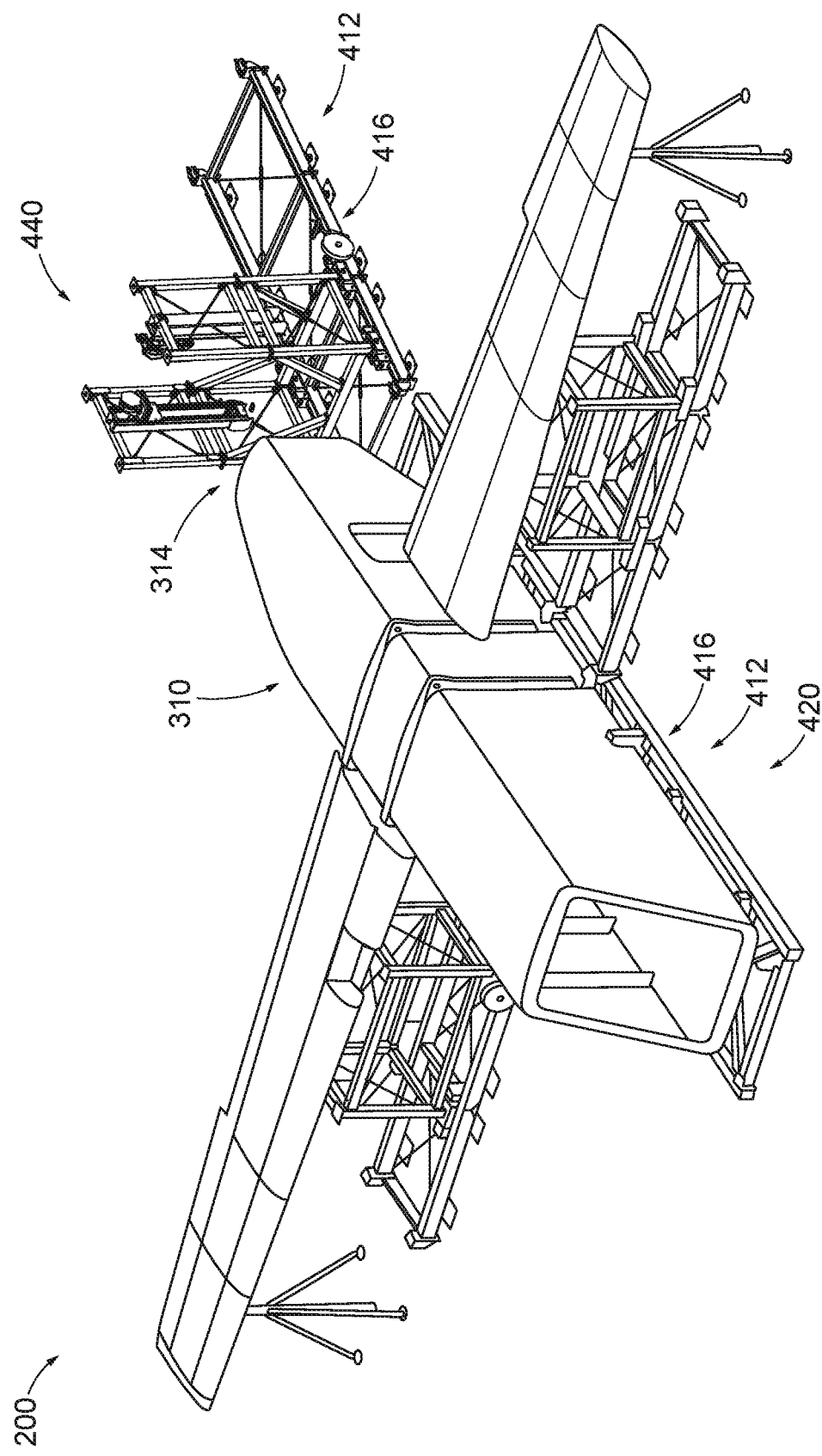
FIG. 11 illustrates an example of an empennage positioning structure during the indexing.

FIGS. 10-11 provide specific, illustrative examples of the indexing at 135. With initial reference to FIG. 10, in some examples, the indexing at 135 comprises indexing one or more wing positioning structures 430 to fuselage positioning structure 420. As shown, each wing positioning structure 430 comprises a base structure 412 having a laterally extending track 416 that is configured to support wing positioning structure 430 on an assembly surface 772, and fuselage positioning structure 420 comprises a base structure 412 having a laterally extending track 416 for supporting fuselage assembly 310 on the assembly surface 772. In some such examples, the indexing at 135 comprises engaging a portion of laterally extending track 416 of each wing positioning structure 430 with laterally extending track 416 of fuselage positioning structure 420, such as to secure wing positioning structure(s) 430 in the proper positions. As shown, wing positioning structure(s) 430 are indexed to fuselage positioning structure 420 proximate to lateral sides 312 of fuselage assembly 310.

Now referring to FIG. 11, the indexing at 135 also may comprise indexing empennage positioning structure 440 to fuselage positioning structure 420. As shown, empennage positioning structure comprises a base structure 412 having a laterally extending track 416, and a portion of a laterally extending track 416 of empennage positioning structure 440 may be engaged with a portion of laterally extending track 416 of fuselage positioning structure 420. In the example shown, empennage positioning structure 440 is indexed to fuselage positioning structure 420 proximate to an aft region 314 of fuselage assembly 310.

While FIGS. 10-11 illustrate the indexing at 135 as being performed while wing positioning structure(s) 430 and empennage positioning structure 440 are not supporting aircraft components 300, it is within the scope of the present disclosure that the indexing at 135 may be performed while any aircraft component positioning structure is supporting one or more respective aircraft components 300. Stated another way, in some examples, the indexing at 135 is performed subsequent to the loading at 140.

Referring back to the examples schematically represented in FIG. 3 and with continued reference to FIG. 2, methods 100 further comprise loading one or more aircraft components onto respective aircraft component positioning structures at 140. As indicated in FIG. 3, in some examples, the loading 140 further comprises loading the one or more aircraft components with the conveying mechanism at 142. As discussed in more detail herein, the loading at 140 may be performed subsequent to the unloading at 130, subsequent to the indexing at 135, prior to the indexing at 135, and/or prior to the positioning at 150.

Figure 12:
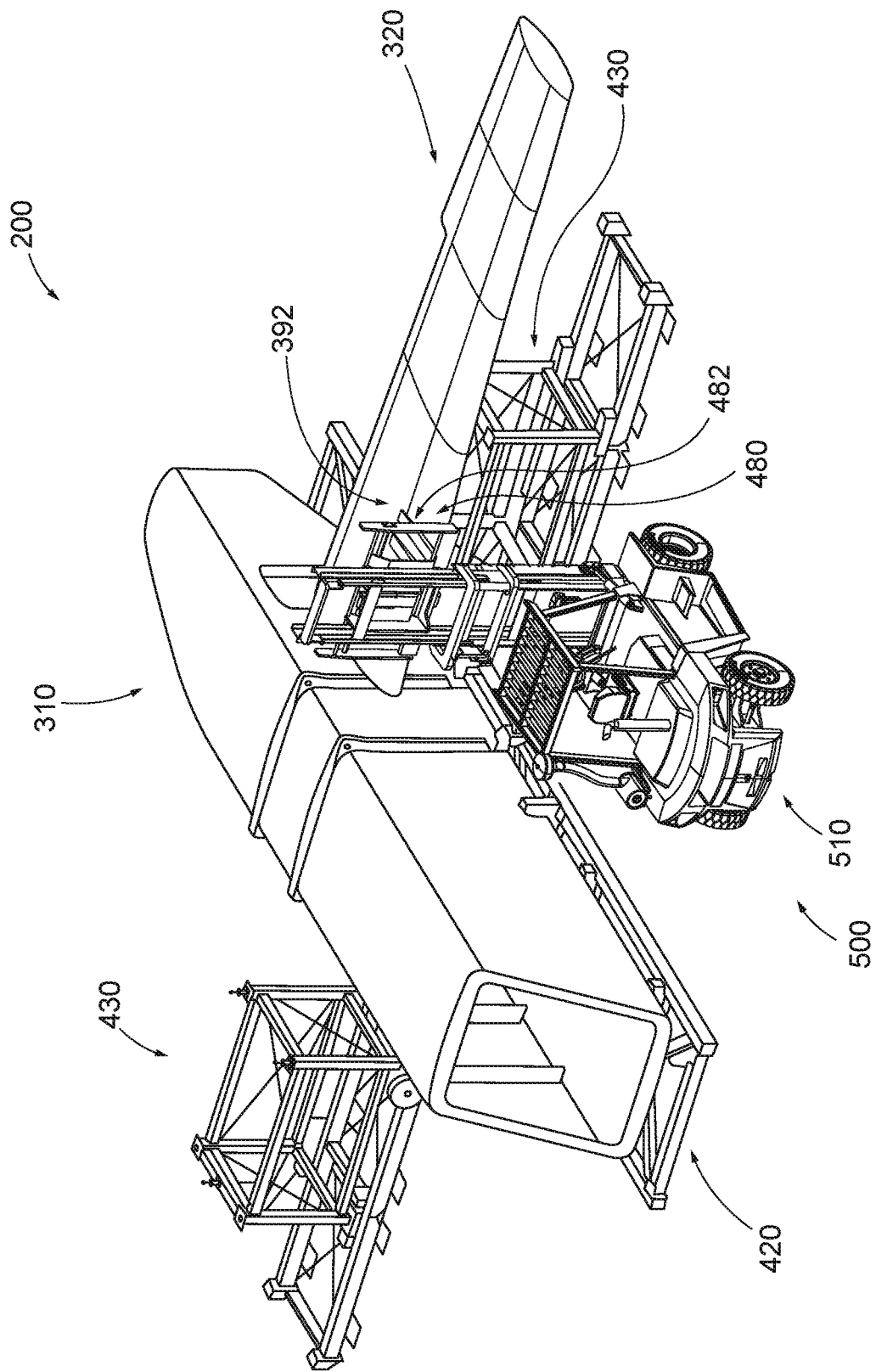
FIG. 12 illustrates an example of loading a wing onto a wing positioning structure.
Figure 13:
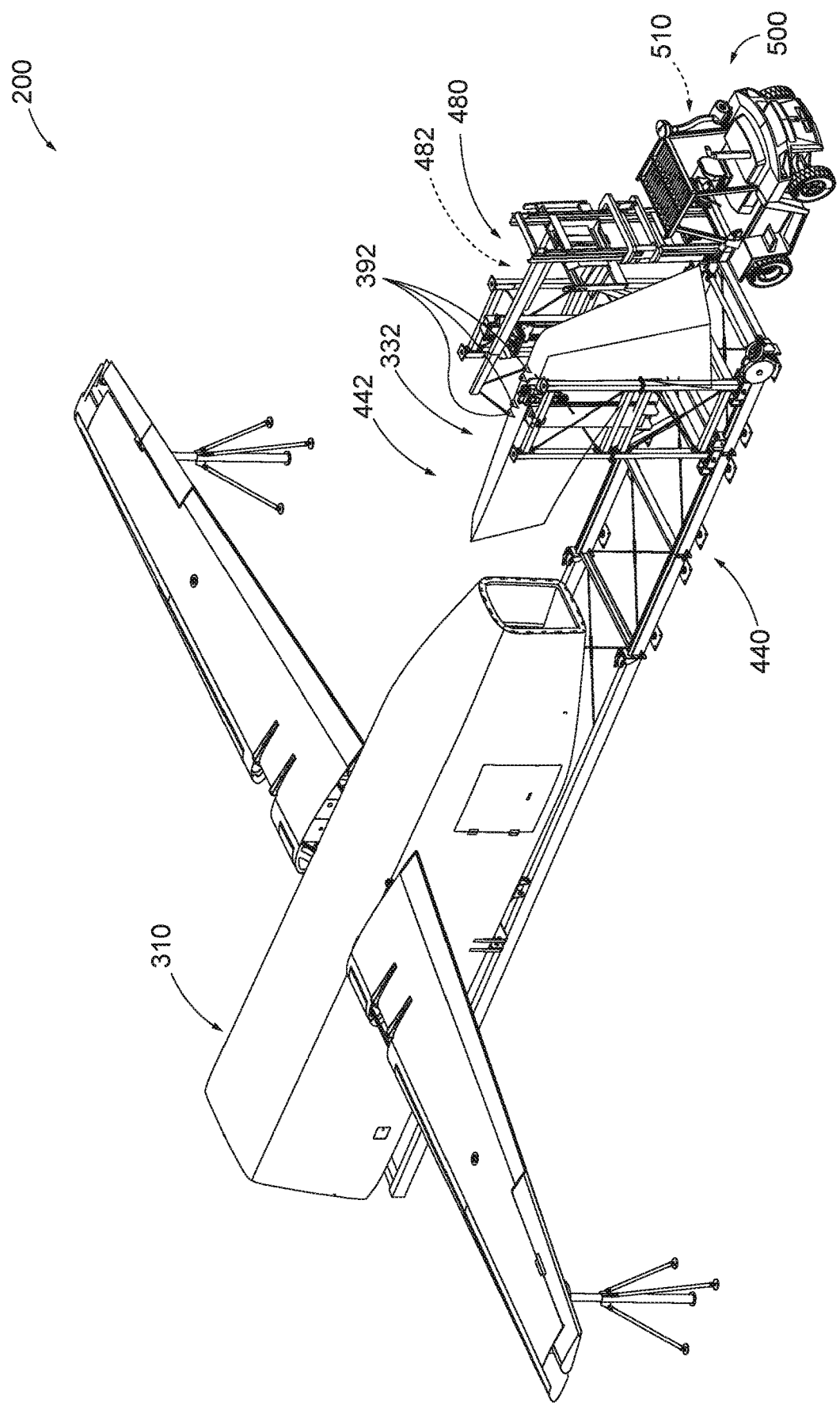
FIG. 13 illustrates an example of loading a vertical tailfin assembly onto the empennage positioning structure.
Figure 14:
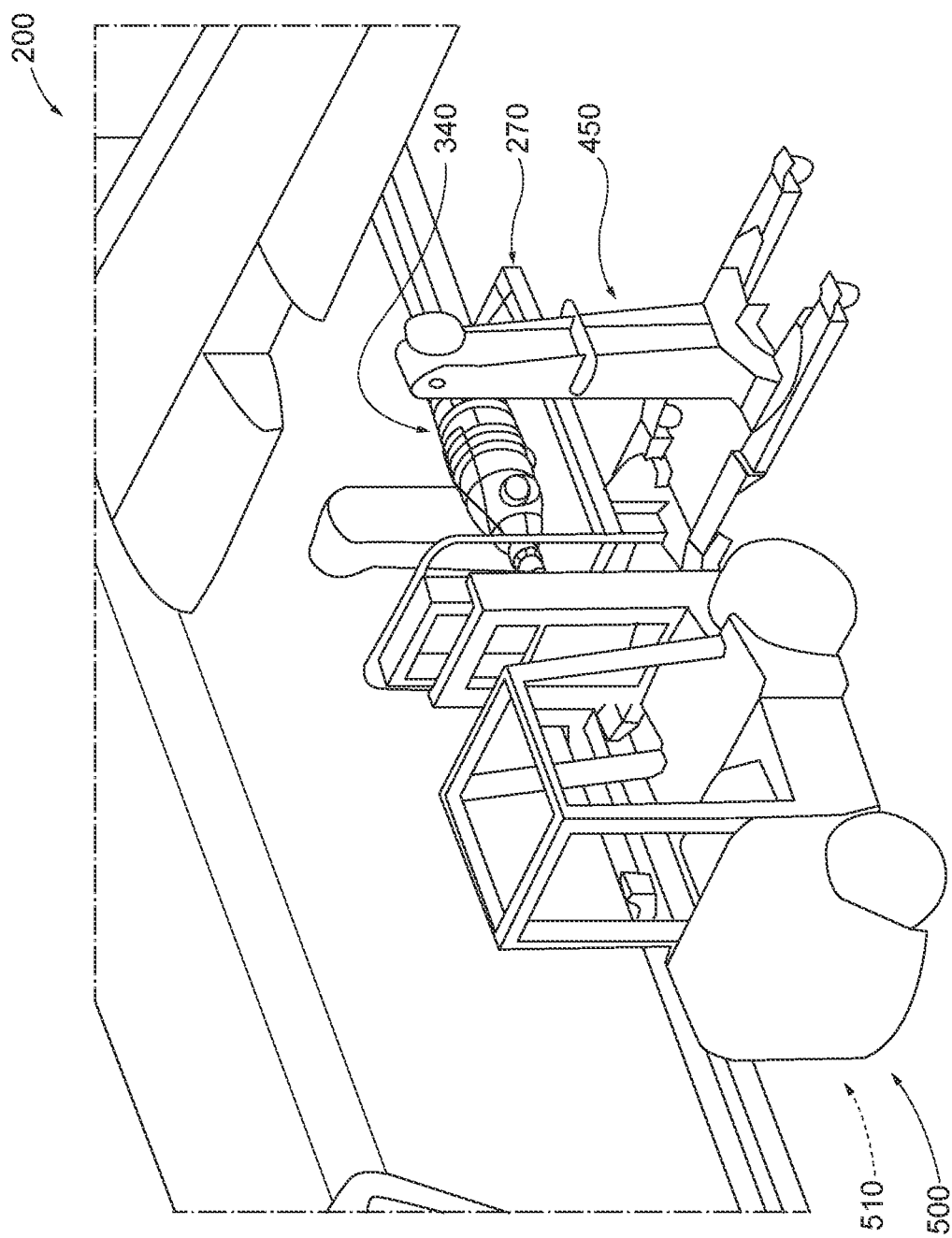
FIG. 14 illustrates an example of loading an engine assembly onto an engine positioning structure.

FIGS. 12-14 provide specific, illustrative examples of the loading at 140 and/or the loading at 142 and component parts of systems 200 that may be utilized and/or loaded during the loading at 140. With initial reference to FIG. 12, illustrated is an example in which the loading at 140 comprises loading wing(s) 320 onto respective wing positioning structure(s) 430. More specifically, in the example shown, wing positioning structure(s) 430 are indexed to fuselage positioning structure 420 prior to the loading the wing(s) at 140, and loading 140 wing(s) 320 comprises loading 142 with conveying mechanism 500. In some such examples, wing(s) 320 comprise handling fitting(s) 392 that are configured to engage with conveying mechanism handle(s) 480 associated with conveying mechanism 500. In the specific example illustrated in FIG. 12, conveying mechanism comprises forklift 510, which is associated with forklift boom handle(s) 482.

Now referring to the examples represented in FIG. 13, the loading at 140 also may comprise loading vertical tailfin assembly 332 onto empennage positioning structure 440. As discussed in more detail herein with respect to the unloading at 130, in some examples, loading 140, 142 vertical tailfin assembly 332 comprises engaging handling fitting(s) 392 of vertical tailfin assembly 332 with conveying mechanism handle(s) 480 to load vertical tailfin assembly 332 onto empennage positioning structure 440 with conveying mechanism 500. As further illustrated in FIG. 13, in some examples, the loading at 140 comprises loading 140 aircraft component 300, such as vertical tailfin assembly 332, onto the respective aircraft component positioning structure 410 in a loading orientation 442.

FIG. 14 provides another illustrative example of the loading at 140, 142, in which engine assembly 340 is loaded onto engine positioning structure 450. As shown, engine assembly 340 is supported by a portion of engine shipping fixture 270, and conveying mechanism 500 is configured to engage with engine shipping fixture 270 to load engine assembly 340 onto engine positioning structure 450. In some such examples, the loading 140, 142 comprises engaging and/or coupling engine positioning structure 450 with engine shipping fixture 270. In some such examples, the portion of engine shipping fixture 270 is utilized in and/or defines a portion of engine positioning structure 450 during subsequent steps of methods 100.

Turning back to the examples of FIG. 3 and with continued reference to FIG. 2, methods 100 further comprise positioning each aircraft component of the plurality of aircraft components in the corresponding aircraft component installation position at 150. For the one or more aircraft components that are loaded onto the one or more respective aircraft component positioning structures, the positioning at 150 comprises positioning using the respective aircraft component positioning structures at 152. In some such examples, the positioning at 152 further comprises performing positional adjustments at 154 on one or more aircraft components with the one or more respective aircraft component positioning structures. The positioning at 150 may be performed subsequent to the unloading at 130, subsequent to the loading at 140, prior to the assembling at 160, substantially simultaneously with the assembling at 160, and/or subsequent to the assembling at 160.

As discussed herein, the corresponding aircraft component installation position also may be referred to as the corresponding installation position. The corresponding installation position of a particular aircraft component may be descried as a plotted or planned position of the particular aircraft component for the assembly of the containerized aircraft. Stated in slightly different terms, the corresponding installation position may be described as a specific location that a particular aircraft component is to be positioned relative to one or more other aircraft components during assembly of the complete aircraft. More than one corresponding installation position may be assigned to a single aircraft component depending on the order in which the aircraft components are assembled. As discussed in more detail herein, in some examples, the positioning at 150 is performed manually and/or without requiring the use of positioning structure. In some such examples, the positioning at 150 is performed with the conveying mechanism. For some examples in which the positioning at 150 of a particular aircraft component and/or pre-attached assembly of more than one aircraft components is performed utilizing a respective aircraft component positioning structure at 152, the positioning at 152 is performed on more than one aircraft component and/or pre-attached assembly of aircraft components utilizing a single aircraft component positioning structure.

In some examples, it is desirable to perform one or more positional adjustments at 154 on one or more aircraft components and/or one or more pre-attached assemblies of aircraft components relative to the corresponding installation position(s) utilizing the respective aircraft component positioning structure. As examples, the one or more positional adjustments may comprise one or more of a pitch adjustment, a roll adjustment, a yaw adjustment, an X positional adjustment, a Y positional adjustment, and/or a Z positional adjustment. With this in mind, one or more aircraft component positioning structures may be configured to facilitate the one or more positional adjustments of one or more respective aircraft components and/or one or more pre-attached assemblies of aircraft components, such as the pitch adjustment, the roll adjustment, the yaw adjustment, the X positional adjustment, the Y positional adjustment, and/or the Z positional adjustment. In some such examples, one or more aircraft component position structures comprise one or more jack mechanisms and/or one or more drive mechanisms that are configured to facilitate the positional adjustments. FIGS. 15-21 provide illustrative examples of aircraft components positioned during the positioning at 150, 152, 154 as well as examples of elements of systems 200 utilized during the positioning at 150, 152.

Figure 15:
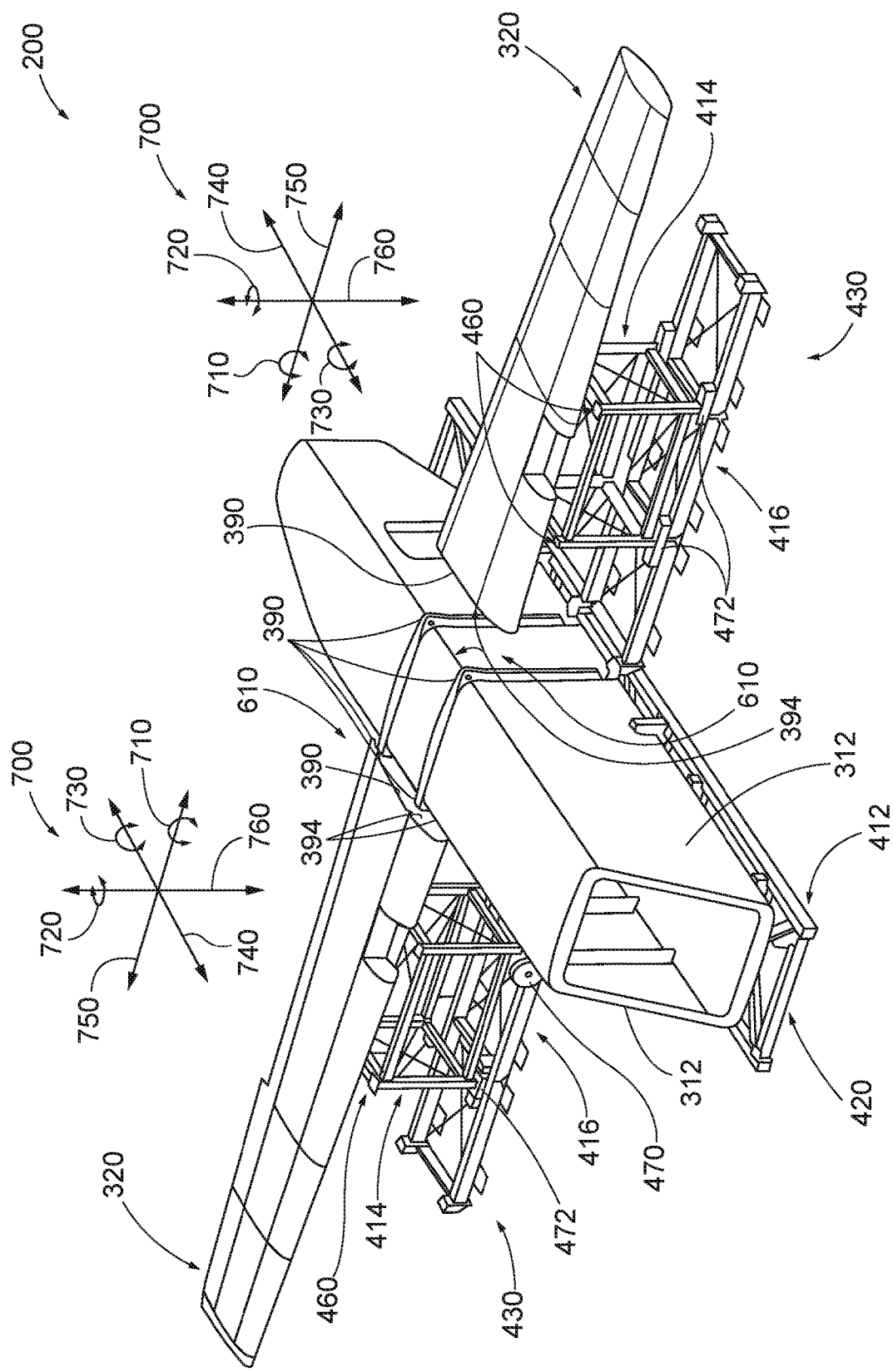
FIG. 15 illustrates an example of positioning wings utilizing wing positioning structures.

FIGS. 10 and 15 illustrate an example of features of wing positioning structure(s) 430 that are utilized during positioning 150, 152, and adjusting 154 wing(s) 320. In the example shown, systems 200 comprise two wings 320 and two respective wing positioning structures 430, and the wing positioning structure(s) 430 are indexed to fuselage positioning structure 420 as described herein with respect to the indexing at 135. Each wing positioning structure 430 is configured to facilitate one or more positional adjustments 700, comprising one or more of a pitch adjustment 710, a yaw adjustment 720, a roll adjustment 730, an X positional adjustment 740, a Y positional adjustment 750, and/or a Z positional adjustment 760 of wing 320 relative to corresponding wing installation position 610. As shown, wing installation position 610 generally is proximate to a lateral side 312 of fuselage assembly 310. Each wing positioning structure 430 comprises laterally extending track 416, and a vertical rise structure 414 translationally coupled to laterally extending track 416 that is configured to operatively support wing(s) 320. Drive mechanism 470 that is associated with vertical rise structure 414 is configured to facilitate translational adjustments of vertical rise structure 414 along laterally extending track 416, thereby permitting Y positional adjustment 750 of wing 320. Wing positioning structure(s) 430 further comprises push mechanisms 472 positioned between vertical rise structure 414 and laterally extending track 416 that are configured to facilitate lateral rotational or yaw adjustment of vertical rise structure 414 relative to laterally extending track 416. In some examples, push mechanisms 472 are configured to permit lateral adjustments of vertical rise structure 414 relative to laterally extending track 416. Stated in different terms, push mechanisms 472 permit wing positioning structure 430 to facilitate yaw adjustment 720 and/or X positional adjustment 740 of wing 320.

Perhaps best illustrated in the example of FIG. 15, wing positioning structure(s) 430 comprise jack mechanisms 460 associated with vertical rise structure 414. Jack mechanisms 460 are configured to facilitate one or more of pitch adjustment 710, roll adjustment 730, and/or Z positional adjustment 760 of wing 320. Perhaps more clearly illustrated in FIG. 10, in some such examples, jack mechanisms 460 of wing positioning structure(s) 430 comprise wing jack mechanisms 462, in which each wing jack mechanism 462 operatively contacts wing 320 at a contact point and is configured to translate vertically such as to facilitate and/or contribute to one or more of the pitch adjustment 710, roll adjustment 730, and/or Z positional adjustment 760 of wing 320. Thus, positioning wing(s) 320 at 150, 152 optionally comprises performing one or more positional adjustment(s) 700 utilizing one or more features of wing positioning structure(s) 430 at 154.

Figure 16:
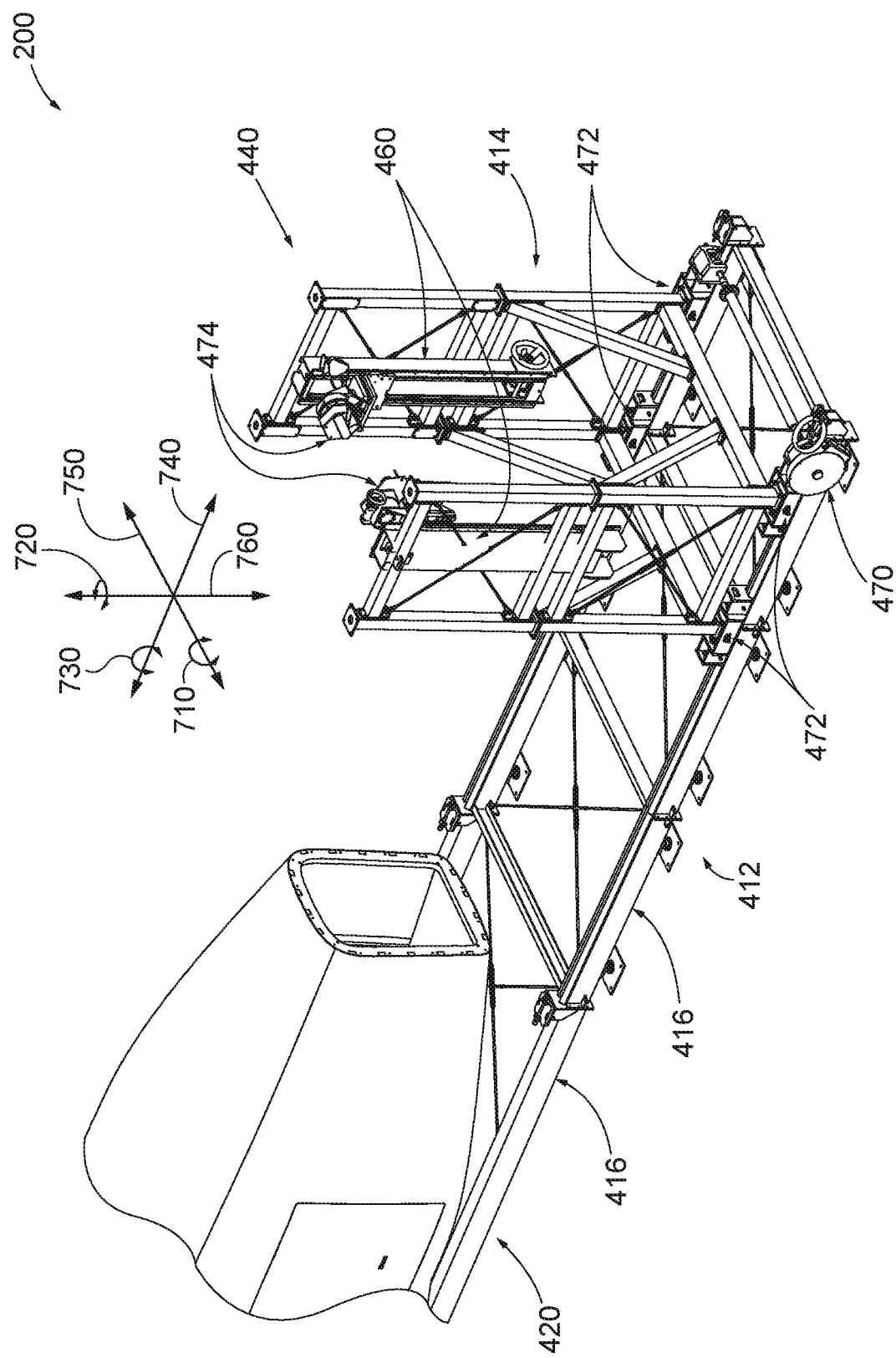
FIG. 16 illustrates a specific example of the empennage positioning structure.

FIGS. 16-19 illustrate examples of the positioning at 150, 152, 154 with respect to vertical tailfin assembly 332, horizontal stabilizer assembly 334, and empennage assembly 330 utilizing empennage positioning structure 440. FIG. 16 illustrates an example of empennage positioning structure 440 prior to the loading at 140 and details features of empennage positioning structure 440 that are configured to facilitate one or more of a pitch adjustment 710, a yaw adjustment 720, a roll adjustment 730, an X positional adjustment 740, a Y positional adjustment 750, and/or a Z positional adjustment 760 of one or more of vertical tailfin assembly 332, horizontal stabilizer assembly 334, and/or empennage assembly 330. More specifically, in this example, empennage positioning structure 440 comprises a laterally extending track 416, and vertical rise structure 414 translationally coupled to laterally extending track 416 that is configured to support the respective aircraft components. Drive mechanism 470 is associated with vertical rise structure 414 and is configured to facilitate translational adjustments of vertical rise structure 414 along laterally extending track 416, and thus X positional adjustment 740 of the one or more respective aircraft components. Empennage positioning structure 440 further comprises push mechanisms 472 that are configured to facilitate yaw adjustment 720 and/or Y positional adjustment 750 of the one or more respective aircraft components, such as by a similar mechanism to that discussed with respect to wing positioning structure(s) 430. Jack mechanisms 460 associated with vertical rise structure 414 are configured to facilitate Z positional adjustment 760 and/or roll adjustment 730 of the respective aircraft component(s), and a rotating drive mechanism 474 associated with jack mechanism 460 are configured to operatively contact the respective aircraft component(s) 300 and facilitate pitch adjustment 710 of the respective aircraft component(s). Thus, positioning 150, 152 one or more of vertical tailfin assembly 332, horizontal stabilizer assembly 334, and empennage assembly 330 optionally comprises performing any of the positional adjustment(s) 700 utilizing empennage positioning structure 440 at 154.

For example, as discussed herein with respect to FIG. 13, in some examples, the loading at 140 comprises loading vertical tailfin assembly 332 onto empennage positioning structure 440 in loading orientation 442. As indicated in the sequence illustrated between FIGS. 13 and 17, the adjusting at 154 may comprise rotating vertical tailfin assembly 332, such as via pitch adjustment 710 utilizing rotating drive mechanisms 474, from loading orientation 442 to an assembly orientation 444. As indicated in FIG. 18, in some examples, when vertical tailfin assembly 332 is in assembly orientation 444, methods 100 comprise positioning at 140 horizontal stabilizer assembly 334 utilizing conveying mechanism 500 proximate to vertical tailfin assembly 332 in horizontal stabilizer installation position 640, and assembling at 160 and/or attaching at 162 vertical tailfin assembly 332 with horizontal stabilizer assembly 334 to form empennage assembly 330. Now referring to the sequence illustrated between FIGS. 18 and 19, in some examples, the positioning at 150, 152 yet further comprises adjusting 154 empennage assembly 330, such as via pitch adjustment 710 utilizing rotating drive mechanisms 474, from assembly orientation 444 to an installation orientation 446, and optionally performing any additional positional adjustment(s) 700, such as X positional adjustments 740 via drive mechanism 470, of empennage assembly 330 utilizing empennage positioning structure 440 to position empennage assembly 330 in empennage installation position 620, which may be described as being located at aft region 314 of fuselage assembly 310.

Figure 17:
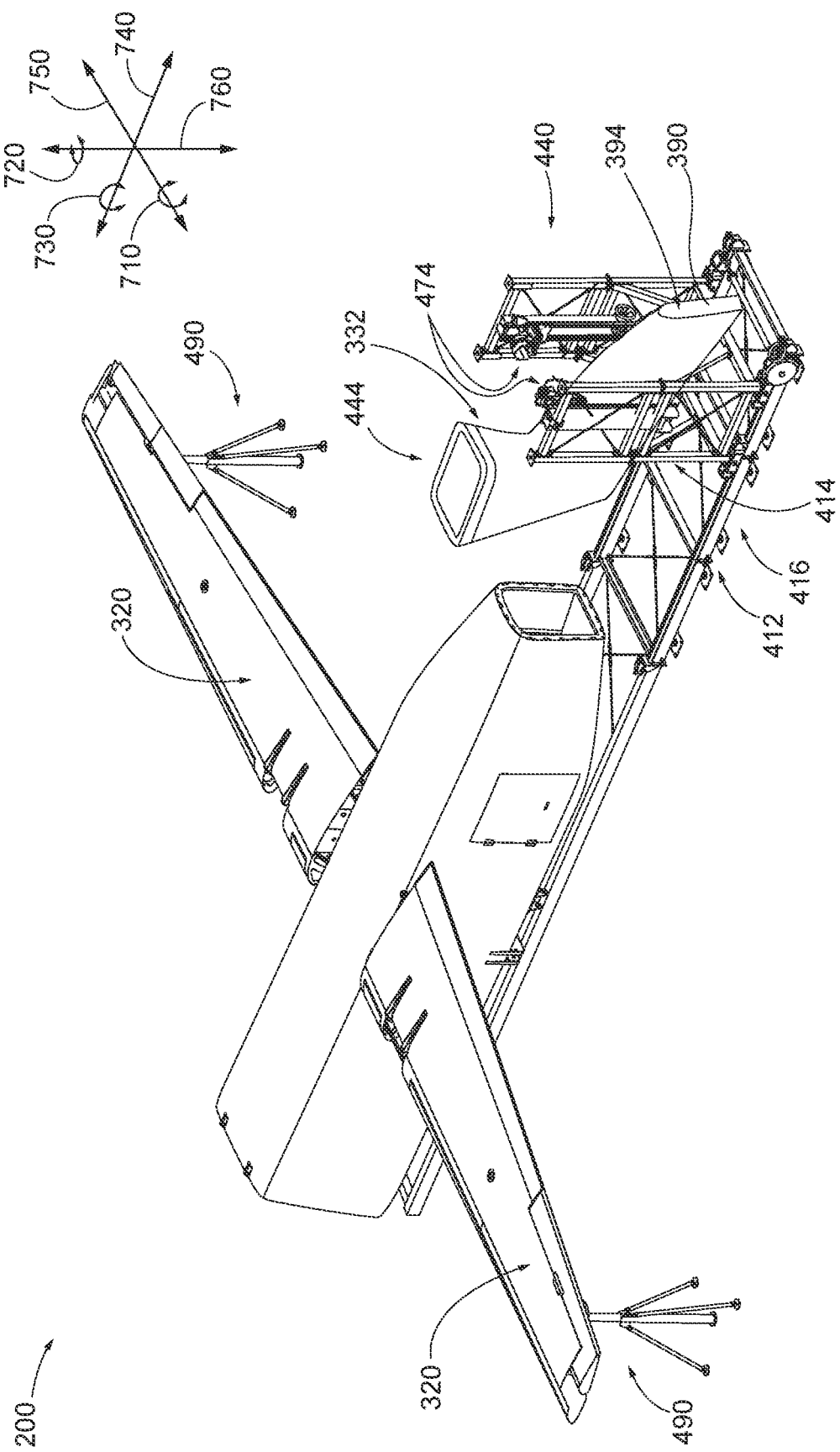
FIG. 17 illustrates a specific example of a vertical tailfin assembly loaded onto the empennage positioning structure.
Figure 18:
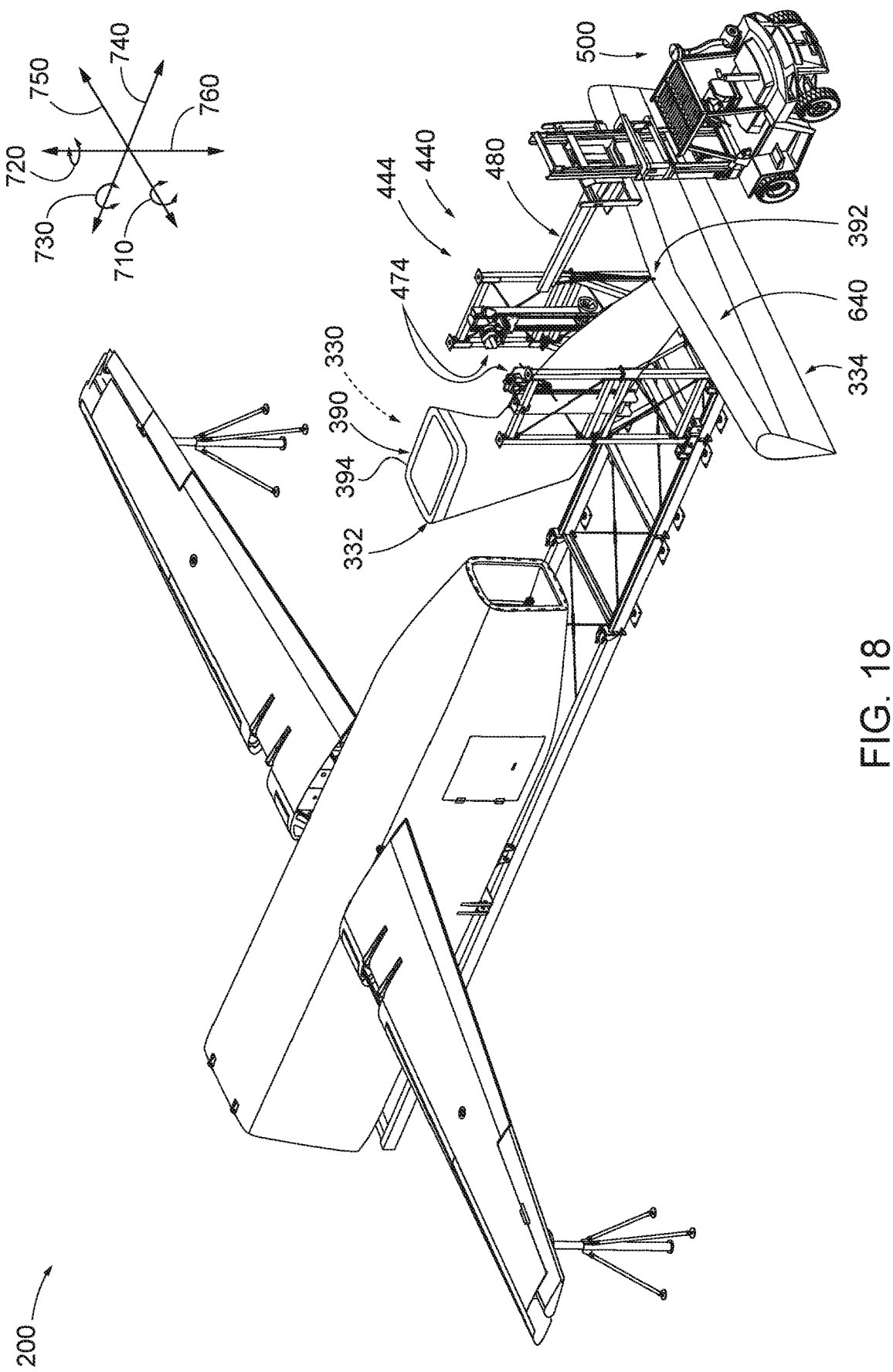
FIG. 18 illustrates a specific example of positioning a horizontal stabilizer assembly.
Figure 19:
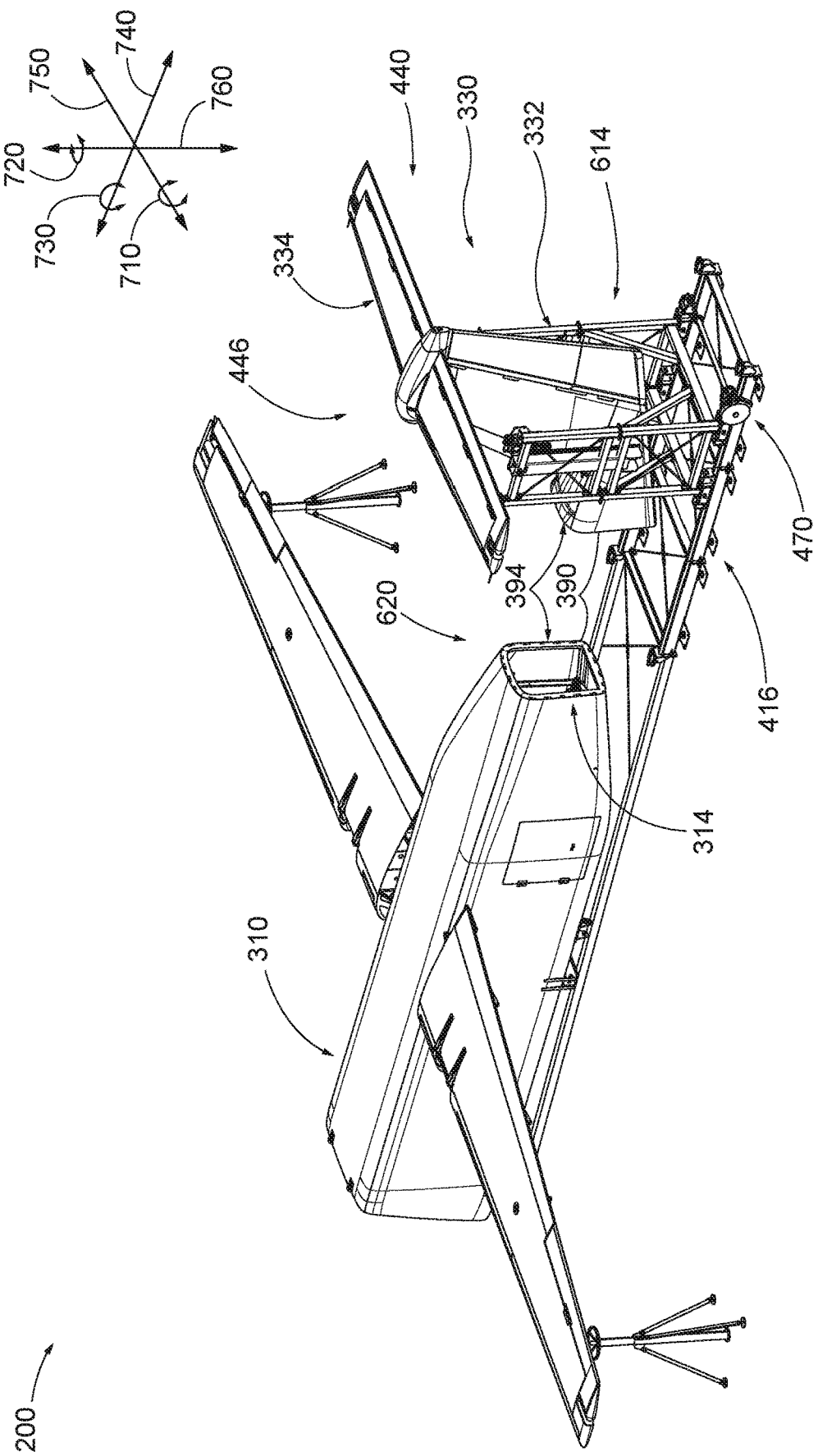
FIG. 19 illustrates a specific example of positioning an empennage assembly utilizing the empennage positioning structure.

While FIGS. 17-19 illustrate specific examples of positioning at 150 and assembling at 160 of a T-tail type empennage assembly 330, other types of empennage assemblies 330 are within the scope of the present disclosure, such as fuselage mounted type empennage assemblies 330 and/or cruciform type empennage assemblies 330. Likewise, the positioning at 150 and assembling at 160 of empennage assembly 330 is not limited to the specific order illustrated in FIGS. 17-19. As examples, methods 100 also may comprise loading at 130 horizontal stabilizer assembly 334 onto empennage positioning structure 440, and positioning 150 vertical tailfin assembly 332 proximate to horizontal stabilizer assembly 334 utilizing conveying mechanism 500, and subsequently assembling at 160 horizontal stabilizer assembly 334 with vertical tailfin assembly 332 to form empennage assembly 330. As yet more examples, methods 100 alternatively comprises positioning at 150, 152 horizontal stabilizer assembly 334 or vertical tailfin assembly 332 in empennage installation position 620, and attaching horizontal stabilizer assembly 334 or vertical tailfin assembly 332 with fuselage assembly 310, prior to attaching horizontal stabilizer assembly 334 with vertical tailfin assembly 332.

Figure 20:
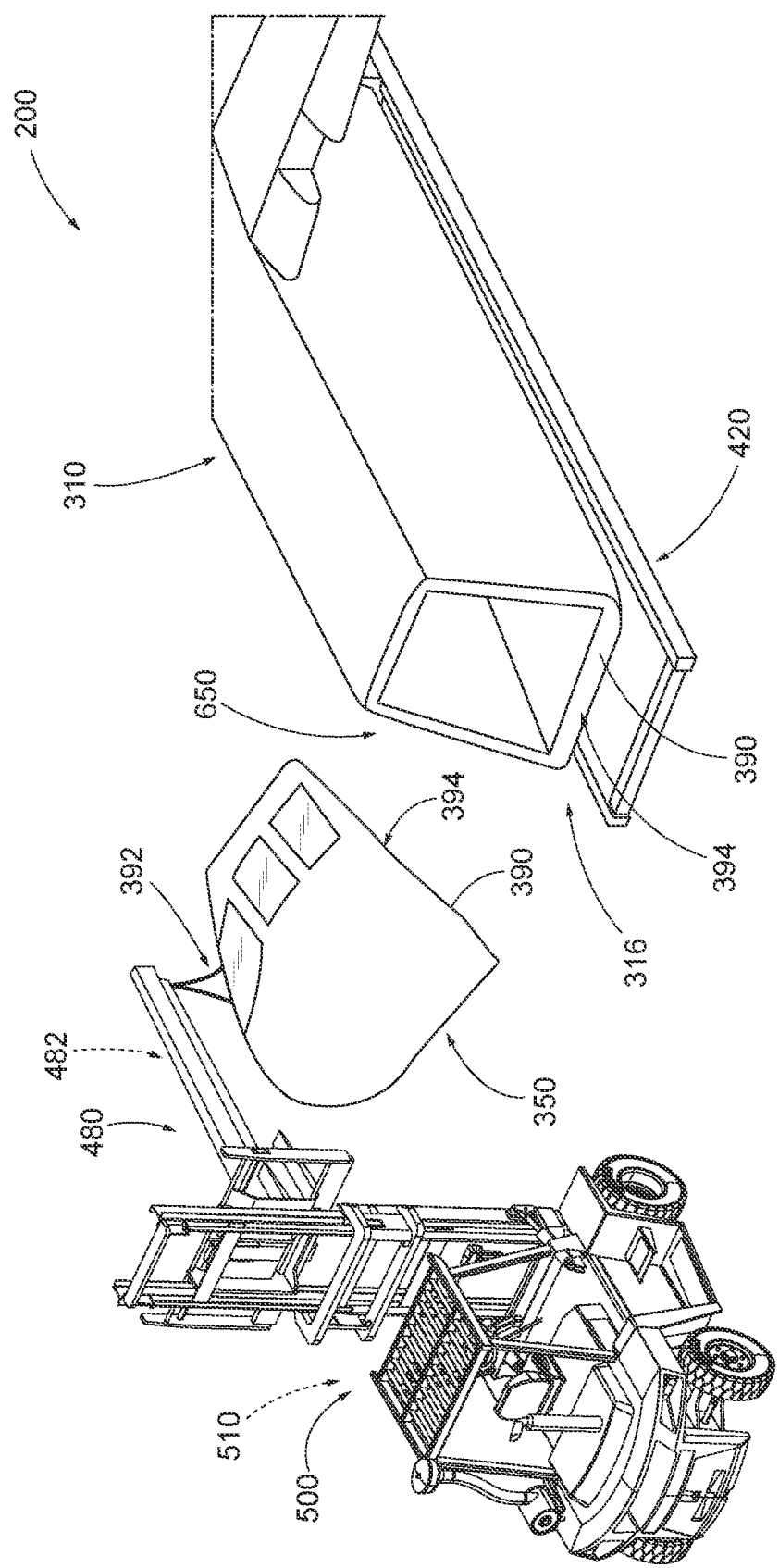
FIG. 20 illustrates a specific example of positioning a nose assembly.

FIG. 20 illustrates an example in which the positioning at 150 is performed independent of a respective aircraft component positioning structure and is performed manually and/or utilizing conveying mechanism 500. In the specific example shown, the positioning at 150 comprises positioning nose assembly 350 in nose installation position 650 utilizing conveying mechanism 500. In some such examples, conveying mechanism handle(s) 480 associated with conveying mechanism 500 engage with handling fittings 392 of nose assembly 350 to facilitate the positioning at 150. As illustrated in FIG. 20, nose installation position 650 may be described as being located at a nose region 316 of fuselage assembly 310.

Figure 21:
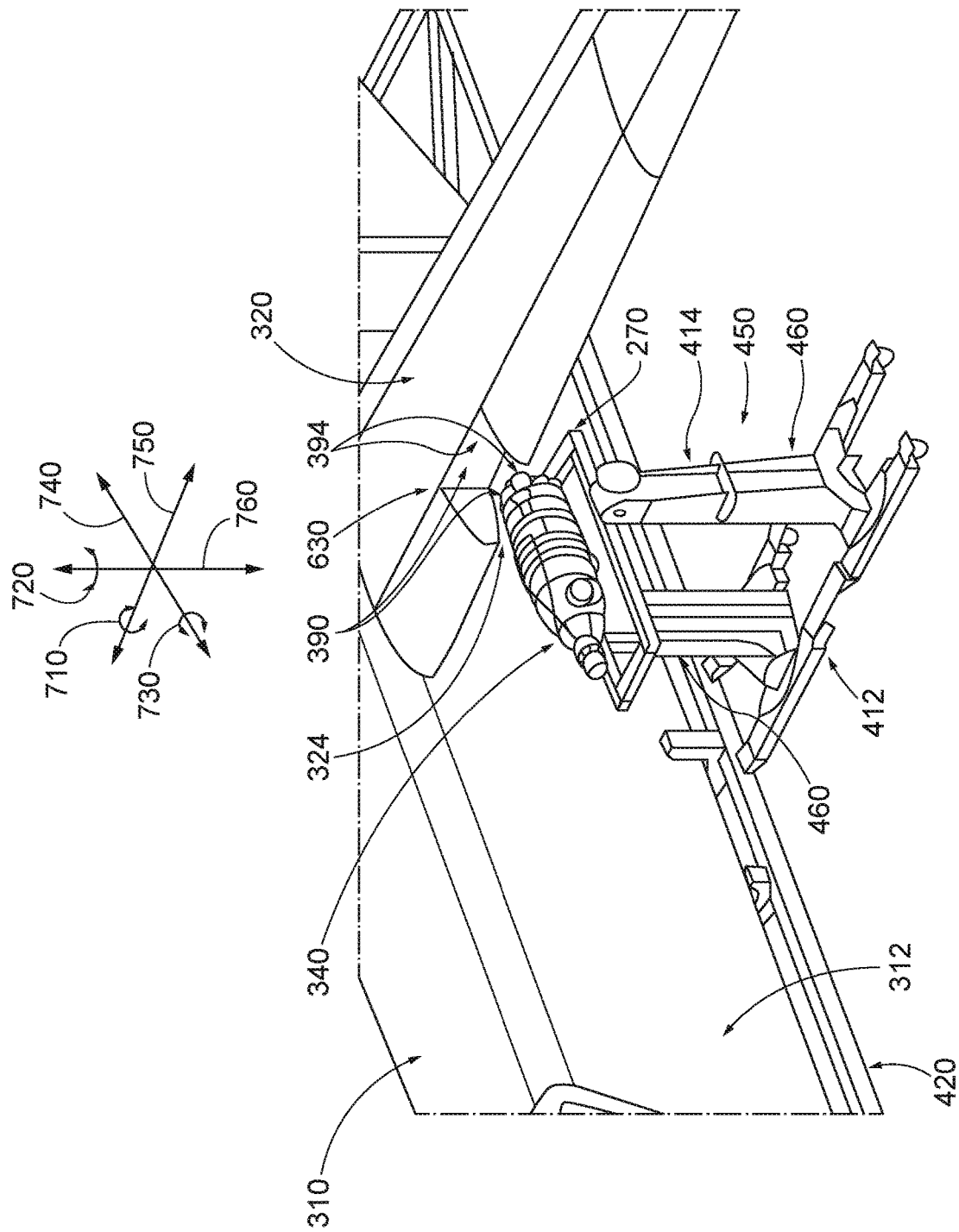
FIG. 21 illustrates a specific example of positioning an engine assembly utilizing an engine positioning structure.

Now referring to FIG. 21, in some examples the positioning at 150, 152, 154 comprises positioning engine assembly(s) 340 in engine installation position(s) 630 utilizing engine positioning structure(s) 450. In some such examples, engine installation position(s) 630 are generally located on an underside 324 of wing(s) 320, and engine positioning structure(s) 450 are indexed to fuselage positioning structure 420 proximate to lateral side(s) 312 of fuselage assembly 310 beneath wing(s) 320. In other examples, engine installation position(s) 630 are located at nose region 316 of fuselage assembly 310, on nose assembly 350, and/or on lateral sides 312 of fuselage assembly. As discussed in relation to FIG. 14, in some examples, a portion of engine shipping fixture(s) 270 are utilized in engine positioning structure(s) 450 to support engine assembly(s) 340 during the positioning at 150, 152. More specifically, as shown in the example of FIG. 21, engine positioning structure 450 comprises base structure 412 that is indexed to fuselage positioning structure 420 and vertical rise structure 414 comprising two jack mechanisms 460 that operatively engage with base structure 412. In some such examples, base structure 412 is configured to translate and/or extend outwardly relative to fuselage positioning structure 420 to permit Y positional adjustments 750 of engine assembly 340. As further shown in FIG. 21, jack mechanisms 460 operatively couple to engine shipping fixture 270 and permit pitch adjustment 710, yaw adjustment 720, roll adjustment 730, Y positional adjustment 750, and Z positional adjustment 760 of engine assembly relative to engine installation position 630. Thus, in some examples, positioning engine assembly(s) 340 at 150, 152, comprises performing one or more positional adjustments 700 at 154 utilizing engine positioning structure(s) 450.

Each of the jack mechanisms 460, wing jack mechanisms 462, drive mechanisms 470, push mechanisms 472, and rotating drive mechanisms 474 associated with any aircraft component positioning structures 410 are configured to facilitate the one or more positional adjustments 700 discussed herein by any suitable mechanism. For instance, in some examples, drive mechanisms 470 and/or rotating drive mechanisms 474 comprise worm drive mechanisms. As more examples, jack mechanisms 460 may comprise screw jack mechanisms. Each of the jack mechanisms 460, wing jack mechanisms 462, drive mechanisms 470, push mechanisms 472, and rotating drive mechanisms 474 associated with any aircraft component positioning structure(s) 410 also are powered by any suitable mechanism with examples including one or more of hydraulically powered, mechanically powered, electrically powered, manually powered, and/or hand powered.

Returning to the examples of FIG. 3 and with continued reference to the examples of FIG. 2, methods 100 further comprise assembling the aircraft components as the complete aircraft by attaching each aircraft component to at least one other aircraft component in the corresponding aircraft component installation position at 160. For examples in which at least a subset of the aircraft components comprise interconnectable preinstalled portions of one or more air aircraft systems, the assembling at 160 further comprises interconnecting the interconnectable portions of each aircraft system to form one or more respective complete aircraft systems at 162. As discussed herein, the interconnecting at 162 comprises interconnecting respective preinstalled portions of a given aircraft system by any suitable mechanism, such as by interconnecting one or more quick connects that are included in a preinstalled portion of the given aircraft system with one or more quick connects included in one or more other preinstalled portions of the given aircraft system. Additionally or alternatively, for examples in which at least some of the aircraft components each comprises one or more predrilled installation interfaces, the assembling at 160 comprises attaching the aircraft components through the predrilled installation interfaces. As discussed herein, attaching refers to any suitable attaching mechanism(s) for adequately joining two or more aircraft components. Examples of suitable mechanism(s) comprise one or more of fastening, coupling, fixing, bolting, screwing, welding, sealing, riveting, pinning, interlocking and/or mounting. In some examples, the assembling at 160 comprises attaching two or more aircraft components 300 with fasteners 302. Additionally or alternatively, the assembling at 160 comprises attaching two or more aircraft components utilizing fastening mechanisms 404.

The assembling at 160 may be performed subsequent to the positioning at 150, 152, subsequent to the adjusting at 154, prior to disengaging at 170, substantially simultaneously with the disengaging at 170, prior to reloading at 180, prior to performing at 190, and/or prior to performing at 195. Examples of the assembling at 160 comprises attaching wing(s) 320 to fuselage assembly 310, attaching engine assembly(s) 340 to wing(s) 320, attaching vertical tailfin assembly 332 to horizontal stabilizer assembly 334, attaching empennage assembly 330 to fuselage assembly 310, attaching landing gear assembly 360 to fuselage assembly 310, and/or attaching nose assembly 350 to fuselage assembly 310.

As indicated in the sequence between FIGS. 15 and 19, in some examples, the assembling at 160 comprises attaching wing(s) 320 to lateral sides 312 of fuselage assembly 310 to assemble wing(s) 320 in wing installation position(s) 610.

More specifically, as shown in FIGS. 12 and 15, in some examples, lateral sides 312 of fuselage assembly 310 and wing(s) 320 comprise predrilled installation interfaces 390. Thus, in such examples, assembling 160 wing(s) with fuselage assembly comprises attaching or coupling respective predrilled installation interfaces 390. FIG. 15 further illustrates an example in which wing(s) 320 and fuselage assembly 310 comprise interconnectable preinstalled portions of one or more aircraft systems 394. Thus, in such examples, assembling wing(s) 320 with fuselage assembly 310 comprises interconnecting interconnectable preinstalled portions of aircraft system(s) 394 to form at least a portion of the one or more respective aircraft systems at 162.

Now referring to the sequence illustrated between FIGS. 17-19, in some examples, the assembling at 160 comprises attaching horizontal stabilizer assembly 334 to vertical tailfin assembly 332 in horizontal stabilizer installation position 640 to form empennage assembly 330. In some such examples, and as illustrated in the sequence between FIGS. 19 and 22, the assembling further comprises attaching empennage assembly 330 to aft region 314 of fuselage assembly 310 to assemble empennage assembly 330 in empennage installation position 620. In other examples, the assembling at 160 comprises attaching horizontal stabilizer assembly 334 or vertical tailfin assembly 332 to fuselage assembly 310 prior to attaching horizontal stabilizer assembly 334 to vertical tailfin assembly 332. As further indicated FIGS. 17-19, in any such examples, each of aft region 314 of fuselage assembly 310, vertical tailfin assembly 332, horizontal stabilizer assembly 334, and/or empennage assembly 330 optionally comprise interconnectable preinstalled portions of one or more aircraft systems 394, and thus assembling any combination of the fuselage assembly 310, the empennage assembly 330, the vertical tailfin assembly 332, and the horizontal stabilizer assembly 334 optionally comprises the interconnecting at 162. Aft region 314 of fuselage assembly 310, vertical tailfin assembly 332, horizontal stabilizer assembly 334, and/or empennage assembly 330 optionally comprise predrilled installation interfaces 390, and thus assembling any combination of the fuselage assembly 310, the empennage assembly 330, the vertical tailfin assembly 332, and the horizontal stabilizer assembly 334 optionally comprises attaching respective predrilled installation interfaces 390.

Figure 22:
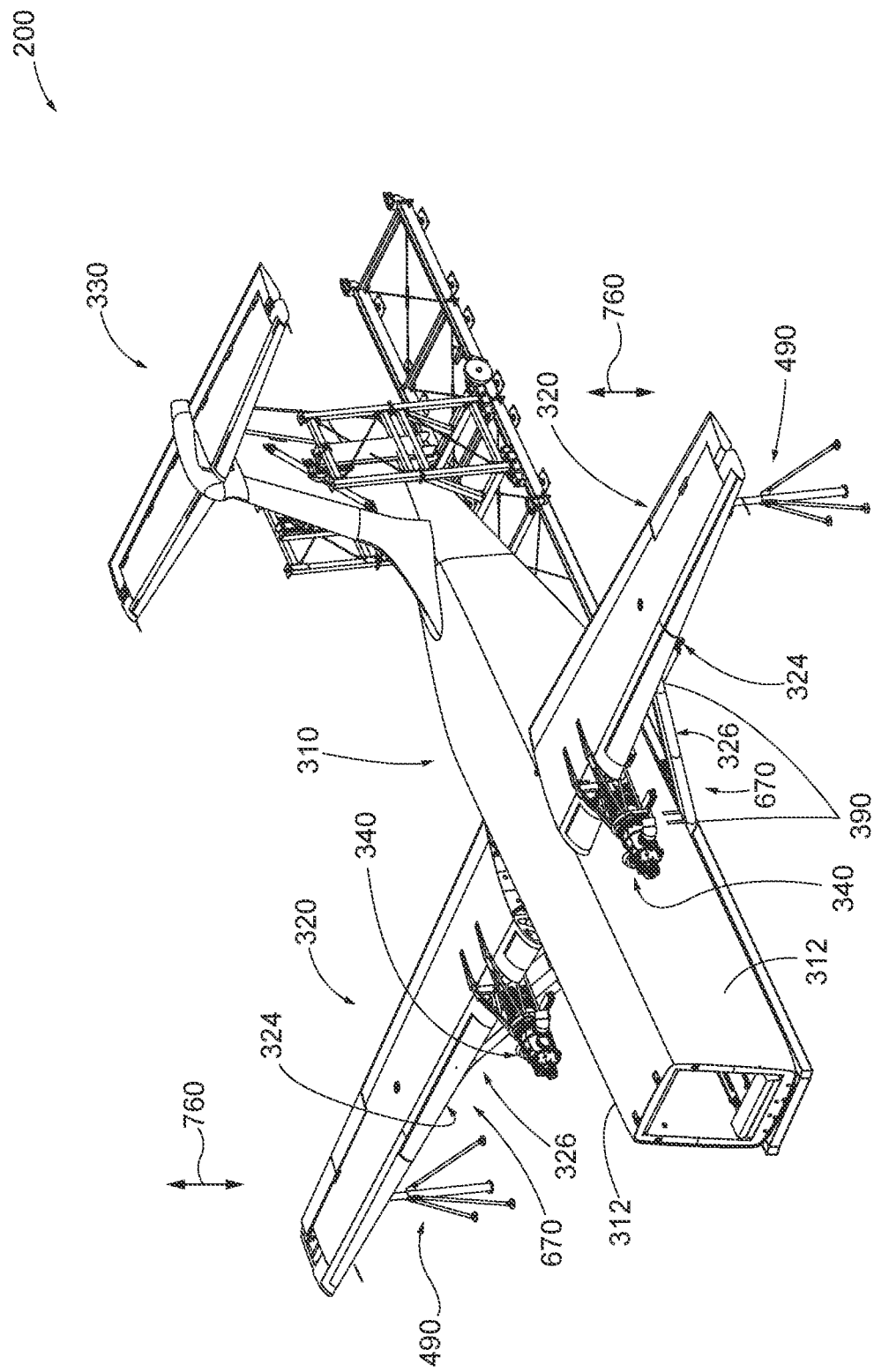
FIG. 22 illustrates examples of component parts of systems that may be utilized during assembling and disengaging.

Referring now to the sequence illustrated between FIGS. 21-22, in some examples, the assembling at 160 comprises attaching engine assembly(s) 340 to the underside(s) 324 of wing(s) 320 to assemble engine assembly(s) 340 in engine installation position(s) 630. As illustrated in the sequence between FIGS. 25 and 1, for examples in which engine assembly(s) 340 correspond to propeller type engines, the assembling at 160 further comprises attaching propeller(s) 342 to engine assembly(s) 340.

Figure 23:
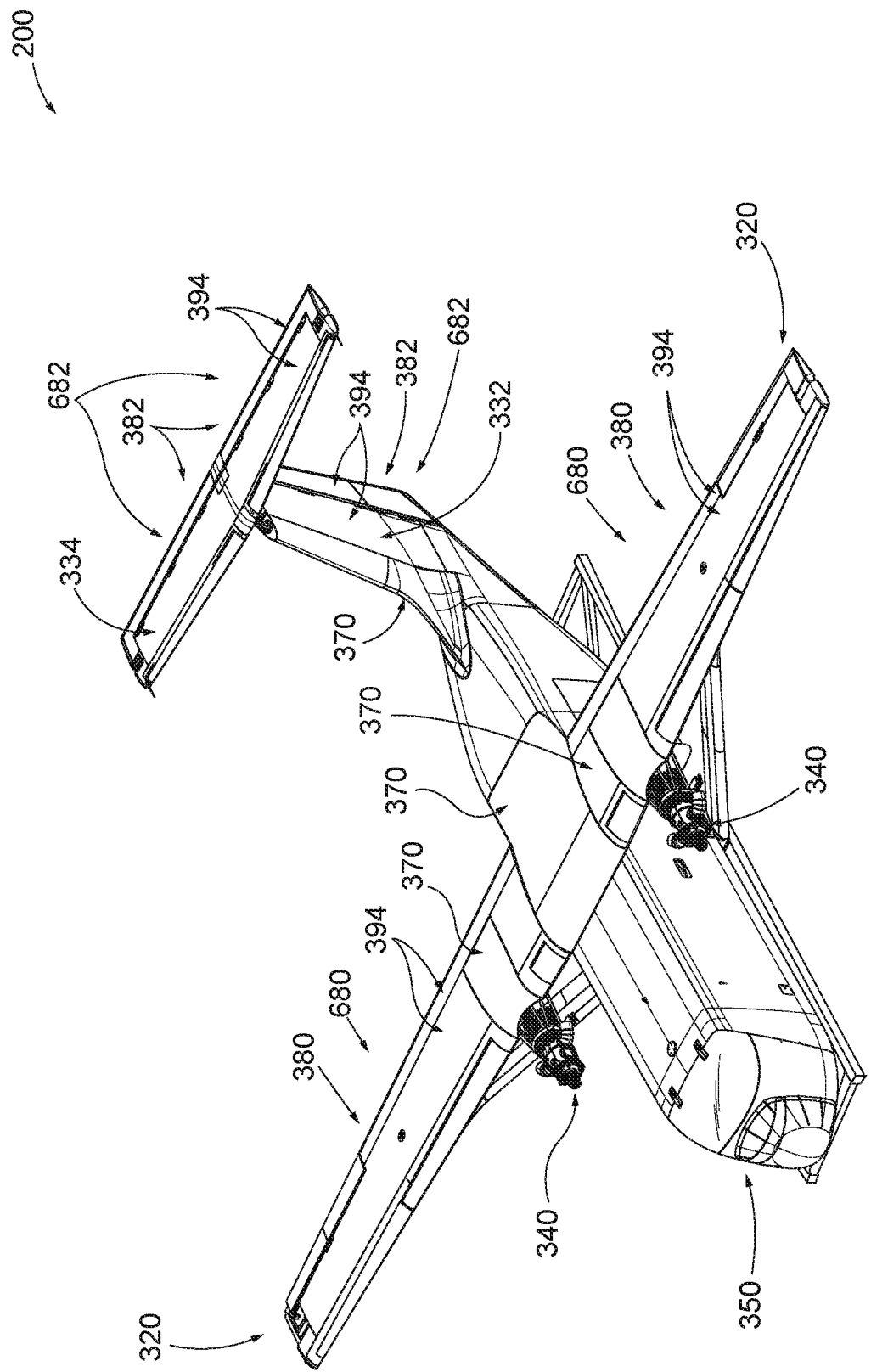
FIG. 23 illustrates a specific example of assembling aircraft fairings, rudders, and flaps.

As shown in the sequence illustrated between FIGS. 20 and 23, the assembling at 160 further may comprise attaching nose assembly 350 to nose region 316 of fuselage assembly 310 to assemble nose assembly 350 in nose installation position 650. As discussed in more detail with respect to assembling 160 wing(s) 320 and empennage assembly 330, and indicated in FIGS. 20-23, assembling 160 engine assembly(s) 340 and/or nose assembly 350 further may comprise interconnecting interconnectable preinstalled portions of aircraft systems, for example fuel systems for engine assembly(s) 340, and/or attaching the respective aircraft components via predrilled installation interfaces 390.

Now referring to FIG. 22, in some examples, systems 200 comprises wing strut(s) 326 for stabilizing wing(s) 320 of complete aircraft 800. In such examples, the assembling at 160 further comprises attaching each wing strut 326 to underside 324 of a wing 320 and a corresponding lateral side 312 of fuselage assembly 310 to assemble each wing strut 326 in wing strut installation position 670. In some such examples, positioning 150 wing strut(s) 326 is performed manually, and/or independently of a respective aircraft component positioning structure 410 and/or with conveying mechanism 500. Additionally or alternatively, as discussed in more detail herein with respect to installing at 172, in some examples, stabilization jacks 490 installed at underside 324 of wing(s) 320 are utilized to perform Z positional adjustments 760 on wing(s) 320 to permit wing strut(s) 326 to be attached in wing strut installation position(s) 670. As shown in the example of FIG. 22, wing strut(s) 326 are attached in wing strut installation position(s) 670 via predrilled installation interfaces 390.

Turning to FIG. 23, for examples in which wing(s) 320 are not preassembled with flap(s) 380, the assembling at 160 comprises attaching flap(s) 380 to wing(s) 320 to assemble flap(s) 380 in flap(s) installation position(s) 680. In some such examples, assembling 160 flap(s) further comprises interconnecting interconnectable preinstalled portions of aircraft system(s) 394 of flap(s) 380 and wing(s) 320 to form at least a portion of the respective complete aircraft system(s) at 162, such as a mechanical system for actuating flap(s) 380. With continued reference to FIG. 23, for examples in which horizontal stabilizer assembly 334 and/or vertical tailfin assembly 332 are not preassembled with rudder(s) 382, the assembling at 160 comprises attaching rudder(s) 382 to one or more of horizontal stabilizer assembly 334 and vertical tailfin assembly 332 to assemble rudder(s) 382 in rudder(s) installation position(s) 682. In some such examples, the assembling at 160 further comprises interconnecting 162 interconnectable preinstalled portions of aircraft system(s) 394 comprised in rudder(s) 382 and one or more of vertical tailfin assembly 332 and horizontal stabilizer assembly 334. As further illustrated in FIG. 23, the assembling at 160 further may comprise attaching aircraft fairings 370 in respective aircraft fairing installation positions. As more specific examples, the assembling at 160 of aircraft fairings 370 may comprise attaching fillet(s) between fuselage assembly 310 and wing(s) 320, attaching engine covering(s) on wing(s) 320 proximate to engine assembly(s) 340, and attaching a leading edge to empennage assembly 330. In some examples, the positioning at 150 of flap(s) 380, rudder(s) 382, and/or aircraft fairings 370 is performed manually, and/or independently of respective aircraft component positioning structure(s).

Figure 24:
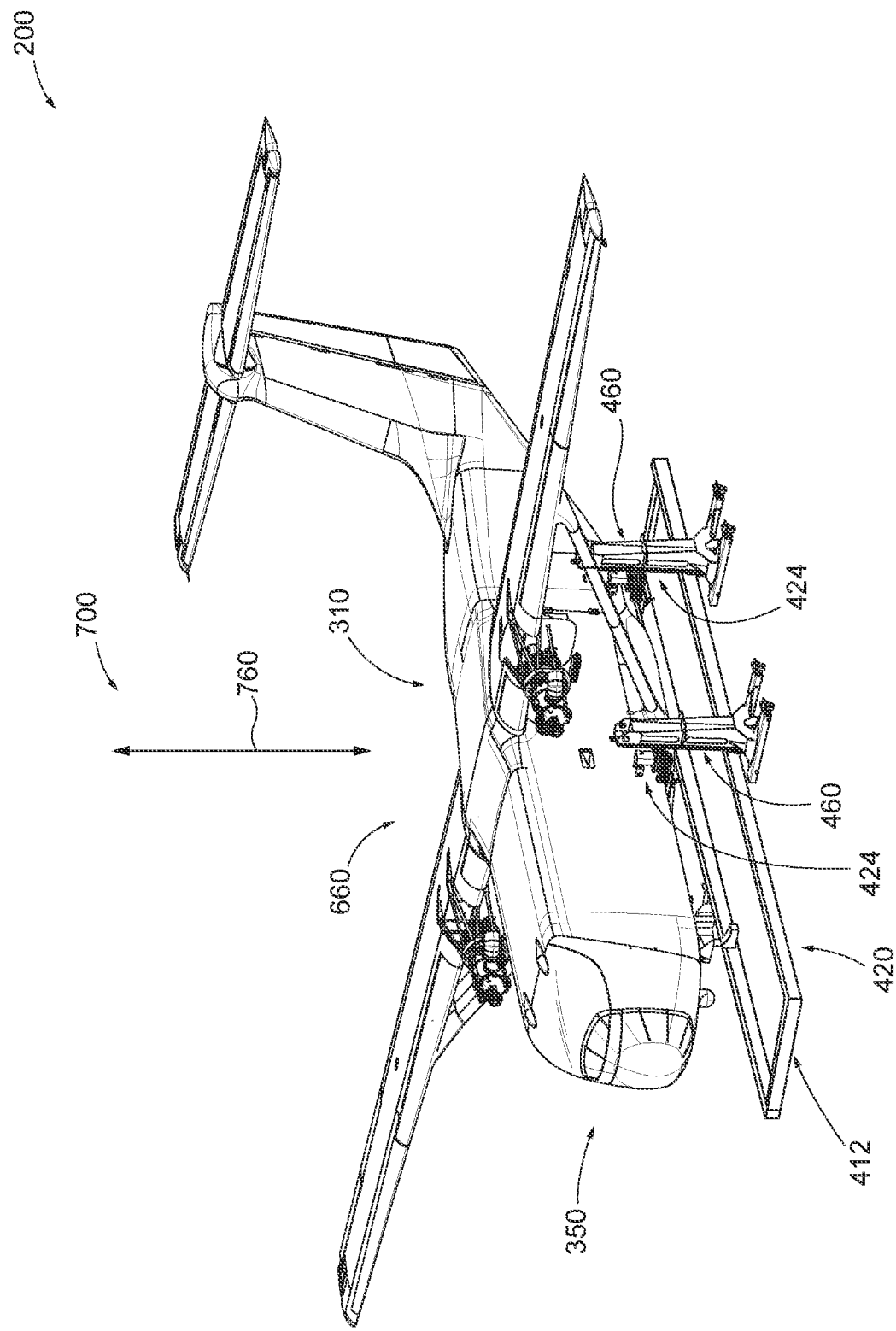
FIG. 24 illustrates a specific example of portions of systems that may be utilized during assembling a landing gear assembly.
Figure 25:
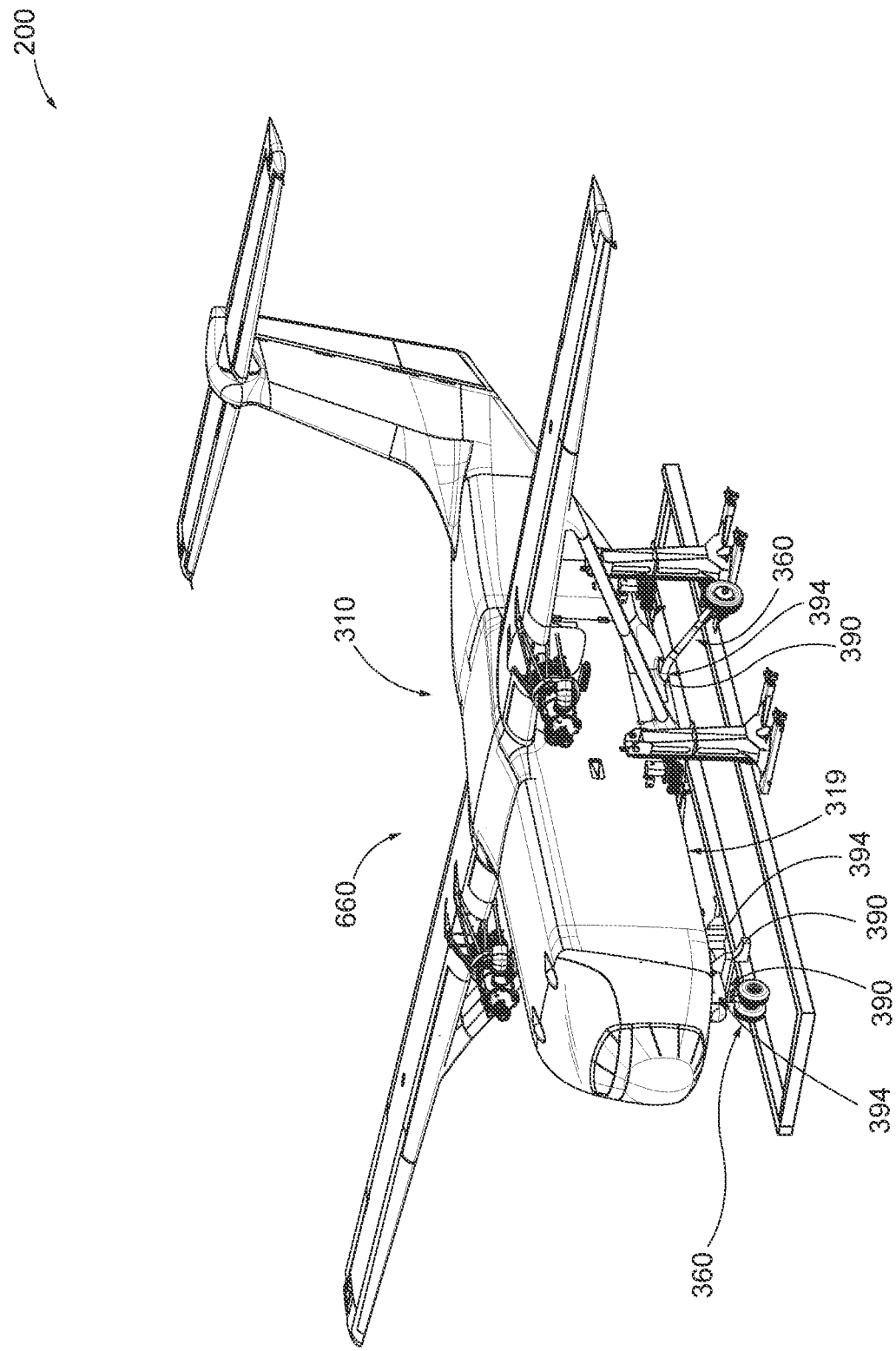
FIG. 25 illustrates a specific example of portions of systems that may be utilized during assembling the landing gear assembly.

In some examples, systems 200 comprise landing gear assembly 360 that is configured to be attached to an underside region 319 of fuselage assembly 310. The examples represented in FIGS. 24-25 illustrate a specific sequence of the indexing at 135, the positioning at 150, 152, the adjusting at 156, and the assembling at 160 that may be utilized to install landing gear assembly 360. With initial reference to FIG. 24, in some examples, installing landing gear assembly 360 comprises performing positional adjustment(s) 700 on fuselage assembly 310 utilizing jack mechanism(s) 460. More specifically, in some such examples, methods 100 comprise indexing at 135 jack mechanism(s) 460 to fuselage positioning structure 420, and engaging jack mechanism(s) 460 with lift header(s) 424 comprised in fuselage positioning structure 420. In the example shown, following the indexing at 135, the positioning at 150 of fuselage assembly 310 comprises lifting (i.e., performing Z positional adjustments 760) fuselage assembly 310 from base structure 412 with jack mechanism(s) 460 and lift header(s) 424 to a landing gear installation position 660. As discussed herein, the jack mechanisms 460 that are utilized to lift fuselage assembly from base structure 412 may be the same jack mechanisms 460 that are comprised in engine positioning structure(s) 450. Now referring to the examples of FIG. 25, once fuselage assembly 310 is positioned in landing gear installation position 660, the assembling at 160 comprises attaching landing gear assembly 360 to an underside region 319 of fuselage assembly 310. In some such examples, the assembling at 160 of landing gear assembly 360 comprises attaching via predrilled installation interfaces 390, and/or interconnecting 162 interconnectable preinstalled portions of aircraft system(s) 394 that comprise fuselage assembly 310 and landing gear assembly 360. As indicated in the sequence illustrated between FIGS. 25 and 1, in some examples the assembling at 160 further comprises attaching aircraft fairing(s) 370 to portions of landing gear assembly 360.

Turning back to FIG. 3, in some examples, methods 100 comprise disengaging aircraft component positioning structure(s) from the respective aircraft component(s) at 170. In some such examples, the disengaging at 170 comprises installing stabilization jacks at 172 to stabilize the respective aircraft component(s) during and/or following the disengaging at 170. Thus, the installing at 172 may be performed prior to, substantially simultaneously with, and/or subsequent to the disengaging at 170. The disengaging at 170 and/or the installing at 172 may be performed substantially simultaneously with the assembling at 160, subsequent to the assembling at 160, prior to the reloading at 180, prior to the performing at 190, and/or prior to the performing at 195.

In some examples, the disengaging at 170 is performed such that a particular portion of the partially assembled aircraft is accessible during subsequent steps of methods 100. Additionally or alternatively, the disengaging at 170 is performed to permit the performance of quality analysis and/or flight test on the complete aircraft. As such, the disengaging at 170 may comprise disengaging each aircraft component positioning structure that is utilized in connection with methods 100 from the partially assembled aircraft and/or the complete aircraft. As a more specific example, when an aircraft component positioning structure was engaged with the fuselage positioning structure during the indexing at 135, the disengaging at 170 further comprises disengaging the aircraft component positioning structure from the fuselage positioning structure.

The sequence illustrated between FIGS. 15 and 17 provides a specific example of the disengaging at 170 and the installing at 172. As shown, in some examples, methods 100 comprise disengaging 170 wing positioning structure(s) 430 from wing(s) 320. In some such examples, the disengaging at 170 comprises installing 172 stabilization jacks 490 to support wing(s) 320 during subsequent steps of methods 100. As shown in FIG. 22, in some examples, stabilization jacks 490 are configured to permit one or more positional adjustments 700, such as Z positional adjustments 760, of the supported aircraft component(s) 300.

Referring again to the examples of FIG. 3 and with continued reference to FIG. 2, methods 100 optionally comprise reloading tooling 400 into the one or more shipping containers at 180. In some examples, the reloading at 180 is performed to permit tooling 400 to be shipped from the assembly location to be reused at another location for assembly of another containerized aircraft. With this in mind, tooling 400 may be configured to be reloaded into shipping containers. The reloading at 180 may comprise reloading a portion of, such as one or more aircraft component positioning structures 410, or the entirety of the tooling 400. With specific reference to aircraft component positioning structure(s) 410, the reloading at 180 may be performed subsequent to the positioning at 152, subsequent to the assembling at 160, subsequent to the disengaging at 170, prior to the performing at 190, 195, and/or subsequent to the performing at 190, 195.

As further illustrated in the examples of FIG. 3, methods 100 optionally comprise performing one or more quality analyses at 190. In some such examples, the methods 100 comprise performing the quality analyses 190 on portions of the partially assembled aircraft. Additionally or alternatively, methods 100 comprise performing quality analyses 190 on the complete aircraft. Methods 100 also may comprise performing a flight test and/or flight certification on the complete aircraft at 195. In some examples, the performing at 190 and/or the performing at 195 is performed at the assembly location. The performing at 190 may be performed subsequent to the disengaging 170, subsequent to the assembling at 160, and/or prior to the performing at 195. The performing at 195 may be performed subsequent to the disengaging 170, subsequent to the assembling at 160, and/or subsequent to the performing at 190. Performing the quality analysis at 190 may be executed to determine whether the assembling of each aircraft component was executed properly, such that the complete aircraft passes one or more specifications. Likewise, performing the flight test at 195 may be executed to determine whether the complete aircraft passes one or more operational specifications. The performing at 190 and the performing at 195 may be performed by the one or more authorized personnel. As discussed herein, the one or more authorized personnel may be employed by, authorized by, and/or trained by the same party that performs one or more of steps 80, 90, and 110 of methods 100.

Illustrative, non-exclusive examples of inventive subject matter according to the present disclosure are described in the following enumerated paragraphs:

A1. A method for assembling a containerized aircraft as a complete aircraft, the method comprising:

removing a plurality of aircraft components supported on one or more shipping fixtures from one or more shipping containers;

removing tooling from the one or more shipping containers, wherein the tooling comprises one or more aircraft component positioning structures;

unloading each aircraft component of the plurality of aircraft components from the one or more shipping fixtures;

loading one or more aircraft components of the plurality of aircraft components onto one or more respective aircraft component positioning structures;

positioning each aircraft component of the plurality of aircraft components in a corresponding aircraft component installation position, wherein the positioning comprises positioning the one or more aircraft components using the one or more respective aircraft component positioning structures; and assembling the plurality of aircraft components as the complete aircraft by attaching each aircraft component of the plurality of aircraft components to at least one other aircraft component of the plurality of aircraft components in the corresponding aircraft component installation position.

A2. The method of paragraphs A1, wherein the plurality of aircraft components comprises a fuselage assembly, one or more wings, one or more engine assemblies, a vertical tailfin assembly, a horizontal stabilizer assembly, and a landing gear assembly.

A3. The method of paragraph A2, wherein the plurality of aircraft components further comprises and a plurality of aircraft fairings, one or more flaps, one or more rudders, and a nose assembly.

A4. The method of any of paragraphs A1-A3, wherein the removing comprises engaging a shipping fixture of the one or more shipping fixtures to convey the shipping fixture and at least a subset of the plurality of aircraft components that are supported on the shipping fixture from a shipping container of the one or more shipping containers.

A5. The method of any of paragraphs A1-A4, wherein the plurality of aircraft components comprises one or more wings, and wherein the unloading comprises unloading a wing of the one or more wings from a wing shipping fixture by pivoting a hinged wing support member of the wing shipping fixture from a shipping orientation, in which the wing is supported by the hinged wing support member with a chord of the wing being oriented upwardly, to an unloading orientation, in which the wing is supported by the hinged wing support member with the chord of the wing being oriented outwardly.

A6. The method of paragraph A5, wherein the unloading the wing further comprises lifting the wing in the unloading orientation from the from the wing shipping fixture with a/the conveying mechanism.

A7. The method of any of paragraphs A5-A6, wherein the unloading comprises unloading a vertical tailfin assembly from the wing shipping fixture by lifting the vertical tailfin assembly from the wing shipping fixture using a/the conveying mechanism.

A8. The method of any of paragraphs A1-A7, wherein the one or more aircraft component positioning structures comprises a fuselage positioning structure for supporting and positioning the fuselage assembly, and wherein the method further comprises:

indexing at least one other aircraft component positioning structure of the one or more aircraft component positioning structures relative to the fuselage positioning structure.

A8.1 The method of any of paragraphs A1-A8, wherein the one or more shipping fixtures comprise a fuselage shipping fixture, and wherein the fuselage shipping fixture is used as a fuselage positioning structure.

A9. The method of paragraph A8, wherein the indexing comprises positioning the at least one other aircraft component positioning structure proximate to the corresponding aircraft component installation position.

A10. The method of any of paragraph A9, where the indexing further comprises engaging a base structure of the fuselage positioning structure and a base structure of the at least one other aircraft component positioning structure.

A11. The method of any of paragraphs A8-A10, wherein the indexing comprises indexing one or more wing positioning structures proximate to one or more lateral sides of the fuselage assembly.

A12. The method of any of paragraphs A8-A11, wherein the indexing comprises indexing an empennage positioning structure proximate to an aft region of the fuselage assembly.

A13. The method of any of paragraphs A1-A12, further comprising:

releasably engaging a conveying mechanism handle associated with a conveying mechanism with a handling fitting of an aircraft component of the plurality of aircraft components;

unloading the aircraft component from a shipping fixture of the one or more shipping fixtures using the conveying mechanism; and loading the aircraft component onto the respective aircraft component positioning structure using the conveying mechanism.

A13.1 The method of paragraph A13, wherein the conveying mechanism comprises a forklift and the conveying mechanism handle comprises a forklift boom handle.

A14. The method of any of paragraphs A1-A13.1, wherein the loading comprises loading a/the one or more wings onto one or more respective wing positioning structures.

A15. The method of any of paragraphs A1-A14, wherein the loading comprises loading a/the vertical tailfin assembly onto an/the empennage positioning structure.

A16. The method of paragraph A15, wherein the loading further comprises operating a/the conveying mechanism to load the vertical tailfin assembly onto the empennage positioning structure.

A17. The method of any of paragraphs A15-A16, wherein loading the vertical tailfin assembly comprises loading the vertical tailfin assembly in a loading orientation, and wherein the positioning comprises rotating the vertical tailfin assembly with the empennage positioning structure from the loading orientation to an assembly orientation.

A18. The method of any of paragraphs A1-A14, wherein the loading further comprises loading a horizontal stabilizer assembly onto an/the empennage positioning structure.

A19. The method of any of paragraphs A1-A18, wherein the positioning comprises performing one or more positional adjustments on an aircraft component of the one or more aircraft components relative to the corresponding aircraft component installation position using the respective aircraft component positioning structure, and wherein the one or more positional adjustments comprise one or more of a pitch adjustment, a roll adjustment, a yaw adjustment, an X positional adjustment, a Y positional adjustment, and a Z positional adjustment.

A19.1. The method of any of paragraphs A1-A19, wherein, at least a subset of aircraft component positioning structures of the one or more aircraft component positioning structures comprises a base structure and a vertical rise structure, wherein the base structure is configured to support the respective aircraft component positioning structure on an assembly surface, and wherein the vertical rise structure extends upwardly from the base structure and is configured to support the at least one respective aircraft component.

A19.2 The method of paragraph A19.1, wherein each aircraft component positioning structure of the subset of aircraft component positioning structures further comprises:

one or more drive mechanisms associated with the vertical rise structure that are configured to facilitate translation of the vertical rise structure along the base structure to permit each aircraft component positioning structure of the subset of aircraft component positioning structures to facilitate one of an X positional adjustment or a Y positional adjustment of at least one respective aircraft component of the plurality of aircraft components; and one or more jack mechanisms associated with the vertical rise structure that are configured to permit each aircraft component positioning structure of the subset of aircraft component positioning structures to facilitate a Z positional adjustment of the at least one respective aircraft component of the plurality of aircraft components.

A20. The method of any of paragraphs A1-A19.1, wherein the positioning comprises positioning two or more aircraft components of the plurality of aircraft components using a single aircraft component positioning structure of the one or more aircraft component positioning structure.

A20.1 The method of any of paragraphs A1-A20, wherein the positioning comprises utilizing one or more jack mechanisms comprising a particular aircraft component positioning structure in another aircraft component positioning structure.

A21. The method of any of paragraphs A1-A20.1, wherein the positioning comprises positioning a/the one or more wings in one or more corresponding wing installation positions using one or more respective wing positioning structures.

A22. The method of paragraph A21, wherein the one or more wing installation positions are located on one or more lateral sides of the fuselage assembly.

A23. The method of any of paragraphs A1-22, wherein the positioning comprises positioning one of an empennage assembly, a/the vertical tailfin assembly, and a/the horizontal stabilizer assembly in an empennage installation position using the empennage positioning structure.

A24. The method of paragraph A23, wherein the empennage installation position is located at an/the aft region of the fuselage assembly.

A25. The method of any of paragraphs A1-A24, wherein the positioning comprises positioning one or more engine assemblies in one or more corresponding engine assembly installation positions.

A26. The method of paragraph A25, wherein the one or more engine assembly installation positions are located on the one or more wings.

A27. The method of any of paragraphs A25-A26, wherein the positioning further comprises positioning the one or more engine assemblies using one or more respective engine assembly positioning structures.

A28. The method of any of paragraphs A1-A27, wherein the positioning comprises lifting a/the fuselage assembly from a base structure of a/the fuselage positioning structure to a desired landing gear installation height by engaging one or more jack mechanisms with one or more lift headers comprising the fuselage positioning structure.

A29. The method of any of paragraphs A1-A28, wherein the positioning comprises positioning a/the nose assembly proximate to a nose region of the fuselage assembly in a nose installation position.

A30. The method of paragraph A29, wherein the positioning of the nose assembly comprises positioning using a/the conveying mechanism.

A31. The method of any of paragraphs A1-A30, wherein the assembling comprises interconnecting interconnectable preinstalled portions of one or more aircraft systems that comprise at least a subset of the plurality of aircraft components to form one or more respective complete aircraft systems.

A31.1 The method of any of paragraphs A1-A30, wherein each aircraft component of at least a subset of the plurality of aircraft components comprises one or more predrilled installation interfaces, and wherein the assembling further comprises attaching each aircraft component of the subset of the plurality of aircraft components to at least one other aircraft component through the one or more predrilled installation interfaces.

A32. The method of any of paragraphs A1-A31, wherein the assembling comprises attaching a/the one or more wings to the one or more lateral sides of the fuselage assembly to assemble the one or more wings in the one or more corresponding wing installation positions.

A33. The method of any of paragraphs A1-A32, wherein the assembling comprises attaching a/the empennage assembly to a/the aft region of the fuselage assembly to assemble the empennage assembly in the empennage installation position.

A34. The method of any of paragraphs A2-A33, wherein the assembling comprises attaching a/the horizontal stabilizer assembly to a/the vertical tailfin assembly in a horizontal stabilizer installation position to form a/the empennage assembly.

A35. The method of any of paragraphs A1-A34, wherein the assembling comprises attaching the horizontal stabilizer assembly to a/the aft region of the fuselage assembly to assemble the horizontal stabilizer assembly in the empennage installation position.

A35.1 The method of any of paragraphs A1-A34, wherein the plurality of aircraft components comprises a fuselage assembly, a vertical tailfin assembly and a horizontal stabilizer assembly, wherein the method further comprises:

positioning the vertical tailfin assembly in a vertical tailfin installation position using an empennage positioning structure;

positioning the horizontal stabilizer assembly in a horizontal stabilizer installation position utilizing a conveying mechanism;

attaching the horizontal stabilizer assembly with the vertical tailfin assembly to form an empennage assembly;

performing positional adjustments on the empennage assembly using the empennage positioning structure to position the empennage assembly in an empennage installation position; and attaching the empennage assembly to the fuselage assembly to assemble the empennage assembly in an empennage assembly installation position.

A36. The method of any of paragraphs A1-A35.1, wherein the assembling comprises attaching one or more engine assemblies to one or more wings to assemble the engine assemblies in the one or more corresponding engine assembly installation positions.

A37. The method of any of paragraphs A1-A36, wherein the assembling comprises attaching a/the landing gear assembly to an underside region of a/the fuselage assembly to assemble the landing gear assembly in one or more landing gear assembly installation positions.

A38. The method of any of paragraphs A1-A37, further comprising disengaging the one or more aircraft components positioning structures from the one or more respective aircraft components.

A39. The method of paragraph A38, further comprising installing one or more stabilization jacks prior to the disengaging.

A40. The method of any of paragraphs A1-A39, further comprising reloading the tooling assembly into the one or more shipping containers.

A41. The method of any of paragraphs A1-A40, further comprising performing a quality analysis of the complete aircraft.

A42. The method of any of paragraphs A1-A41, wherein the method is performed at an assembly location.

A43. The method of any of paragraphs A1-A42, further comprising performing a flight test and certification at a/the assembly location.

B1. The method of any of paragraphs A1-A43, further comprising using a system of any paragraphs C1-C36 to assemble the complete aircraft.

B2. The method of any of paragraphs A1-A43, further comprising delivering a/the system of any paragraphs C1-C36 to a/the assembly location.

C1. A system for assembling a containerized aircraft as a complete aircraft, the system comprising:

a plurality of aircraft components that are configured to be loaded into one or more shipping containers in a shipping arrangement, and wherein each aircraft component of the plurality of aircraft components is configured to be unloaded from the shipping arrangement and attached to at least one other aircraft component of the plurality of aircraft components to assemble the plurality of aircraft components into the complete aircraft;

one or more shipping fixtures configured to support the plurality of aircraft components in the shipping arrangement; and tooling configured to facilitate assembly of the plurality of aircraft components into the complete aircraft, wherein the tooling is configured to be loaded into and unloaded from the one or more shipping containers, wherein the tooling comprises one or more aircraft component positioning structures, and wherein each aircraft component positioning structure of the one or more aircraft component positioning structures is configured to position at least one respective aircraft component of the plurality of aircraft components in at least one corresponding aircraft component installation position during assembly of the complete aircraft.

C2. The system of paragraph C1, wherein the plurality of aircraft components comprises a fuselage assembly, one or more wings, one or more engine assemblies, a vertical tailfin assembly, a horizontal stabilizer assembly, and a landing gear assembly.

C3. The system of paragraph C2, wherein the plurality of aircraft components further comprises a nose assembly.

C4. The system of any of paragraphs C2-C3, wherein the plurality of aircraft components further comprises a plurality of aircraft fairings, one or more flaps, and one or more rudders.

C5. The system of any of paragraphs C1-C4, wherein at least a subset of the plurality of aircraft components comprises interconnectable preinstalled portions of one or more aircraft systems.

C6. The system of paragraph C5, wherein the interconnectable preinstalled portions of each aircraft system of the one or more aircraft systems are configured to be interconnected to form a complete aircraft system.

C7. The system of any of paragraphs C1-C6, wherein each aircraft component of at least a subset of the plurality of aircraft components comprises one or more predrilled installation interfaces configured to permit a drilling-free attachment of each aircraft component of the subset of the plurality of the aircraft components.

C8. The system of any of paragraphs C1-C7, wherein one or more aircraft components of the plurality of aircraft components comprises one or more handling fittings configured to releasably engage with a conveying mechanism.

C9. The system of paragraph C8, wherein the one or more handling fittings are configured to releasably engage with at least one conveying mechanism handle of the one or more conveying mechanism handles.

C10. The system of any of paragraphs C1-C9, further comprising the one or more shipping containers.

C11. The system of any of paragraphs C1-C10, wherein a/the fuselage assembly comprises an open internal volume, and wherein one or more aircraft components of the plurality of aircraft components are configured to be received within the open internal volume of the fuselage assembly when the plurality of aircraft components are arranged in the shipping arrangement.

C12. The system of paragraph C11, wherein the one or more aircraft components comprises a/the horizontal stabilizer assembly and one or more engine assemblies, and wherein the horizontal stabilizer assembly is supported by a empennage shipping fixture, and wherein the one or more engine assemblies are supported by an engine shipping fixture.

C13. The system of any of paragraphs C1-C12, wherein the one or more shipping fixtures comprises a fuselage shipping fixture that is configured to support and arrange a/the fuselage assembly in the shipping arrangement.

C14. The system of any of paragraphs C1-C13, wherein the one or more shipping fixtures comprises a wing shipping fixture that is configured to support and arrange one or more wings in the one or more shipping containers.

C15. The system of any of paragraphs C1-C14, wherein the wing shipping fixture further is configured to support and arrange a/the nose assembly in the shipping arrangement.

C16. The system of any of paragraphs C14-C15, wherein the wing shipping fixture comprises a hinged wing support member that is configured to operatively support a wing of the one or more wings, wherein the hinged wing support member is configured to pivot between a shipping orientation and an unloading orientation, wherein the hinged wing support member is configured to support the wing with a chord of the wing oriented upwardly in the shipping orientation, and wherein the hinged wing support member is configured to support the wing with the chord of the wing oriented outwardly in the unloading orientation.

C17. The system of paragraph C16, wherein the hinged wing support member is a first hinged wing support member, and wherein the wing shipping fixture further comprises a second hinged wing support member.

C18. The system of any of paragraphs C16-C17, wherein the wing is configured to be unloaded from the wing shipping fixture in the unloading orientation.

C19. The system of any of paragraphs C1-C18, wherein the tooling is configured to be manually operated, and wherein the tooling is configured to be operated independent of computer aided systems.

C20. The system of any of paragraphs C1-C19, wherein the tooling is configured to facilitate the assembly of the plurality of aircraft components into the complete aircraft in a plurality of assembly environments.

C21. The system of paragraph C20, wherein each assembly environment of the plurality of assembly environments comprises an assembly surface, wherein the assembly surface comprises one or more of an uneven assembly surface, a dirt assembly surface, a grassy assembly surface, an unfinished assembly surface, and a wet assembly surface.

C22. The system of any of paragraphs C1-C21, wherein the system further comprises a/the conveying mechanism configured to convey the one or more aircraft components of the plurality of aircraft components from a respective shipping fixture of the one or more shipping fixture to a respective aircraft component positioning structure.

C23. The system of any of paragraphs C1-C22, wherein the conveying mechanism further is configured to convey the one or more shipping fixtures from the one or more shipping containers.

C24. The system of any of paragraphs C22-C23, wherein the conveying mechanism comprises a forklift.

C25. The system of any of paragraphs C1-C24, wherein the tooling comprises one or more conveying mechanism handles, wherein each conveying mechanism handle is configured to associate with the conveying mechanism and releasably engage with one or more respective handling fittings.

C26. The system of any of paragraphs C22-C25, wherein the one or more conveying mechanism handles comprise at least one forklift boom handle.

C27. The system of any of paragraphs C1-C26, wherein at least one aircraft component positioning structure of the one or more aircraft component positioning structures is configured to position two or more aircraft components of the plurality of aircraft components.

C28. The system of any of paragraphs C1-C27, wherein the plurality of aircraft component positioning structures comprises one or more wing positioning structures.

C29. The system of any of paragraphs C1-C28, wherein the plurality of aircraft component positioning structures comprises an empennage positioning structure.

C30. The system of any of paragraphs C1-C29, wherein at least one of the one or more aircraft component positioning structures comprises a base structure and vertical rise structure, wherein the base structure is configured to support the vertical rise structure on an/the assembly surface and comprises a laterally extending track, wherein the vertical rise structure extends upwardly from the laterally extending track and is configured to operatively support the at least one respective aircraft components.

C31. The system of any of paragraphs C1-C30, wherein at least one of the one or more aircraft component positioning structures is configured to facilitate one or more positional adjustments of the at least one respective aircraft component of the plurality of aircraft components, wherein the one or more positional adjustments comprise one or more of a pitch adjustment, a yaw adjustment, a roll adjustment, an X positional adjustment, a Y positional adjustment, and a Z positional adjustment.

C32. The system of paragraphs C1-C31, wherein the plurality of aircraft component positioning structures comprises a fuselage positioning structure.

C33. The system of paragraph C32, wherein the fuselage positioning structure comprises the fuselage shipping fixture.

C34. The system of any of paragraphs C1-C33, wherein the plurality of aircraft component positioning structures comprises one or more engine positioning structures, and wherein each engine positioning structure is configured to facilitate one or more positional adjustments of an engine assembly of a/the one or more engine assemblies, wherein the one or more positional adjustments comprise one or more of a/the pitch adjustment, a/the yaw adjustment, a/the roll adjustment, an/the X positional adjustment, a/the Y positional adjustment, and a/the Z positional adjustment.

C35. The system of any of paragraphs C1-C34, wherein each of a/the one or more engine positioning structures, a/the one or more wing positioning structures, and an/the empennage positioning structure comprise one or more jack mechanisms that are configured to facilitate the one or more positional adjustments of the at least one respective aircraft components.

C36. The system of any of paragraphs C1-C35, wherein each of a/the one or more wing positioning structures and an/the empennage positioning structures comprise one or more drive mechanisms that are configured to facilitate the one or more positional adjustments of the at least one respective aircraft components.

D1. A method for assembling a containerized aircraft as a complete aircraft, the method comprising:

removing a plurality of aircraft components supported on one or more shipping fixtures from one or more shipping containers, wherein the plurality of aircraft components comprises one or more wings, one or more engine assemblies, a vertical tailfin assembly, and a horizontal stabilizer assembly;

removing tooling from the one or more shipping containers, wherein the tooling comprises a plurality of aircraft component positioning structures, and wherein the plurality of aircraft component positioning structures comprises a fuselage positioning structure, one or more wing positioning structures, one or more engine positioning structures, and an empennage positioning structure;

unloading each aircraft component of the plurality of aircraft components from the one or more shipping fixtures;

indexing the one or more wing positioning structures to the fuselage positioning structure proximate to lateral portions of a fuselage assembly;

loading the one or more wings onto the one or more wing positioning structures;

positioning the one or more wings in one or more corresponding wing installation positions using the one or more wing positioning structures;

attaching the one or more wings to the fuselage assembly;

indexing the empennage positioning structure to the fuselage positioning structure proximate to an aft region of the fuselage assembly;

loading the vertical tailfin assembly onto the empennage positioning structure;

attaching the horizontal stabilizer assembly to the vertical tailfin assembly on the empennage positioning structure to form an empennage assembly;

positioning the empennage assembly in a corresponding empennage installation position using the empennage positioning structure;

attaching the empennage assembly to the fuselage assembly;

indexing the one or more engine positioning structures to the fuselage positioning structure proximate to one or more lateral portions of the fuselage assembly beneath the one or more wings;

loading the one or more engine assemblies onto the one or more engine positioning structures;

positioning the one or more engine assemblies in one or more corresponding engine assembly installation positions using the one or more engine positioning structures; and attaching the one or more engine assemblies to the one or more wings.

E1. A method of preassembling and delivering a system for assembling a containerized aircraft as a complete aircraft, the method comprising:

preassembling each aircraft component of a plurality of aircraft components from a respective set of subcomponents;

loading the plurality of aircraft components and a tooling onto one or more shipping fixtures in a shipping arrangement;

loading the one or more shipping fixtures supporting the tooling and the plurality of aircraft components into one or more shipping containers; and delivering the one or more shipping containers from a delivery location to an assembly location.

E2. The method of paragraph E1, further comprising preassembling the tooling, wherein the tooling is configured to facilitate assembly of the plurality of aircraft components as the complete aircraft, and wherein the preassembling the tooling comprises preassembling one or more aircraft component positioning structures.

E3. The method of any of paragraphs E1-E2 further comprising, the method of any of paragraphs A1-A43.

E4. The method of any of paragraphs E1-E2 further comprising, the method of paragraph D1.

E5. The method of any of paragraphs E1-E4, wherein the system comprises the system of any of paragraphs C1-C36.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "comprising" may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" may mean A alone, B alone, C alone, A and B together, A and C together, B and C together, A, B, and C together, and optionally any of the above in combination with at least one other entity.

As used herein, "at least substantially," when modifying a degree or relationship, includes not only the recited "substantial" degree or relationship, but also the full extent of the recited degree or relationship. A substantial amount of a recited degree or relationship may include at least 75% of the recited degree or relationship. For example, an object that is at least substantially formed from a material includes an object for which at least 75% of the object is formed from the material and also includes an object that is completely formed from the material. As another example, a first direction that is at least substantially parallel to a second direction includes a first direction that forms an angle with respect to the second direction that is at most 22.5 degrees and also includes a first direction that is exactly parallel to the second direction. As another example, a first length that is substantially equal to a second length includes a first length that is at least 75% of the second length, a first length that is equal to the second length, and a first length that exceeds the second length such that the second length is at least 75% of the first length.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

As used herein the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. A method for assembling a containerized aircraft as a complete aircraft, the method comprising:
   removing a plurality of aircraft components supported on one or more shipping fixtures from one or more shipping containers;
   removing tooling from the one or more shipping containers, wherein the tooling comprises one or more aircraft component positioning structures;
   unloading each aircraft component of the plurality of aircraft components from the one or more shipping fixtures;
   loading one or more aircraft components of the plurality of aircraft components onto one or more respective aircraft component positioning structures;
   positioning each aircraft component of the plurality of aircraft components in a corresponding aircraft component installation position, wherein the positioning comprises positioning the one or more aircraft components using the one or more respective aircraft component positioning structures; and
   assembling the plurality of aircraft components as the complete aircraft by attaching each aircraft component of the plurality of aircraft components to at least one other aircraft component of the plurality of aircraft components in the corresponding aircraft component installation position.

2. The method of claim 1, wherein the plurality of aircraft components comprises a fuselage assembly, one or more wings, one or more engine assemblies, a vertical tailfin assembly, a horizontal stabilizer assembly, and a landing gear assembly.

3. The method of claim 1, wherein the removing the plurality of aircraft components comprises engaging a shipping fixture of the one or more shipping fixtures to convey the shipping fixture and at least a subset of the plurality of aircraft components that are supported on the shipping fixture from a shipping container of the one or more shipping containers.

4. The method of claim 1, wherein the plurality of aircraft components comprises one or more wings, and wherein the unloading comprises unloading a wing of the one or more wings from a wing shipping fixture by pivoting a hinged wing support member of the wing shipping fixture from a shipping orientation, in which the wing is supported by the hinged wing support member with a chord of the wing being oriented upwardly, to an unloading orientation, in which the wing is supported by the hinged wing support member with the chord of the wing being oriented outwardly.

5. The method of claim 1, wherein the one or more aircraft component positioning structures comprises a fuselage positioning structure for supporting and positioning a fuselage assembly, and wherein the method further comprises:
   indexing at least one other aircraft component positioning structure of the one or more aircraft component positioning structures relative to the fuselage positioning structure.

6. The method of claim 5, wherein the indexing comprises:
   positioning the at least one other aircraft component positioning structure proximate to the corresponding aircraft component installation position; and
   engaging a base structure of the fuselage positioning structure and a base structure of the at least one other aircraft component positioning structure.

7. The method of claim 1, wherein the positioning comprises performing one or more positional adjustments on an aircraft component of the one or more aircraft components relative to the corresponding aircraft component installation position using the respective aircraft component positioning structure.

8. The method of claim 7, wherein the one or more positional adjustments include one or more of a pitch adjustment, a roll adjustment, a yaw adjustment, an X positional adjustment, a Y positional adjustment, and a Z positional adjustment.

9. The method of claim 1, wherein at least a subset of aircraft component positioning structures of the one or more aircraft component positioning structures comprises a base structure and a vertical rise structure, wherein the base structure is configured to support the respective aircraft component positioning structure on an assembly surface, and wherein the vertical rise structure extends upwardly from the base structure and is configured to support the at least one respective aircraft component.

10. The method of claim 9, wherein each aircraft component positioning structure of the subset of aircraft component positioning structures further comprises:
one or more drive mechanisms associated with the vertical rise structure that are configured to facilitate translation of the vertical rise structure along the base structure to permit each aircraft component positioning structure of the subset of aircraft component positioning structures to facilitate one of an X positional adjustment or a Y positional adjustment of at least one respective aircraft component of the plurality of aircraft components; and
one or more jack mechanisms associated with the vertical rise structure that are configured to permit each aircraft component positioning structure of the subset of aircraft component positioning structures to facilitate a Z positional adjustment of the at least one respective aircraft component of the plurality of aircraft components.

11. The method of claim 1, wherein the assembling comprises interconnecting interconnectable preinstalled portions of one or more aircraft systems that comprise at least a subset of the plurality of aircraft components to form one or more respective complete aircraft systems.

12. The method of claim 1, wherein each aircraft component of at least a subset of the plurality of aircraft components comprises one or more predrilled installation interfaces, and wherein the assembling further comprises attaching each aircraft component of the subset of the plurality of aircraft components to at least one other aircraft component through the one or more predrilled installation interfaces.

13. The method of claim 1, wherein the plurality of aircraft components comprise a fuselage assembly, a vertical tailfin assembly and a horizontal stabilizer assembly, wherein the method further comprises:
positioning the vertical tailfin assembly in a vertical tailfin installation position using an empennage positioning structure;
positioning the horizontal stabilizer assembly in a horizontal stabilizer installation position utilizing a conveying mechanism;
attaching the horizontal stabilizer assembly with the vertical tailfin assembly to form an empennage assembly;
performing positional adjustments on the empennage assembly using the empennage positioning structure to position the empennage assembly in an empennage installation position; and
attaching the empennage assembly to the fuselage assembly to assemble the empennage assembly in an empennage assembly installation position.

14. The method of claim 1, wherein the positioning comprises utilizing one or more jack mechanisms comprising a particular aircraft component positioning structure in another aircraft component positioning structure.

15. The method of claim 1, wherein the one or more shipping fixtures comprise a fuselage shipping fixture, and wherein the fuselage shipping fixture is used as a fuselage positioning structure.

16. The method of claim 1, further comprising:
releasably engaging a conveying mechanism handle associated with a conveying mechanism with a handling fitting of an aircraft component of the plurality of aircraft components;
unloading the aircraft component from a shipping fixture of the one or more shipping fixtures using the conveying mechanism; and
loading the aircraft component onto the respective aircraft component positioning structure using the conveying mechanism.

17. The method of claim 16, wherein the conveying mechanism comprises a forklift and the conveying mechanism handle comprises a forklift boom handle.

18. The method of claim 1, further comprising performing one or more of a quality analyses on the complete aircraft at an assembly location, and performing a flight test on the complete aircraft at the assembly location.

19. The method of claim 1, wherein each aircraft component of the plurality of aircraft components is detached from the at least one other aircraft component of the plurality of aircraft components during the removing.

20. A method for assembling a containerized aircraft as a complete aircraft, the method comprising:
removing a plurality of aircraft components supported on one or more shipping fixtures from one or more shipping containers, wherein the plurality of aircraft components comprises a fuselage assembly, one or more wings, one or more engine assemblies, a vertical tailfin assembly, and a horizontal stabilizer assembly;
removing tooling from the one or more shipping containers, wherein the tooling comprises a plurality of aircraft component positioning structures, and wherein the plurality of aircraft component positioning structures comprises a fuselage positioning structure, one or more wing positioning structures, one or more engine positioning structures, and an empennage positioning structure;
unloading each aircraft component of the plurality of aircraft components from the one or more shipping fixtures;
indexing the one or more wing positioning structures to the fuselage positioning structure proximate to lateral portions of the fuselage assembly;
loading the one or more wings onto the one or more wing positioning structures;
positioning the one or more wings in one or more corresponding wing installation positions using the one or more wing positioning structures;
attaching the one or more wings to the fuselage assembly;
indexing the empennage positioning structure to the fuselage positioning structure proximate to an aft region of the fuselage assembly;
loading the vertical tailfin assembly onto the empennage positioning structure;
attaching the horizontal stabilizer assembly to the vertical tailfin assembly on the empennage positioning structure to form an empennage assembly;
positioning the empennage assembly in a corresponding empennage installation position using the empennage positioning structure;
attaching the empennage assembly to the fuselage assembly;
indexing the one or more engine positioning structures to the fuselage positioning structure proximate to one or more lateral portions of fuselage assembly beneath the one or more wings;

loading the one or more engine assemblies onto the one or more engine positioning structures;
positioning the one or more engine assemblies in one or more corresponding engine assembly installation positions using the one or more engine positioning structures; and
attaching the one or more engine assemblies to the one or more wings.

\* \* \* \* \*